(12) United States Patent
Inoshita

(10) Patent No.: US 10,762,671 B2
(45) Date of Patent: Sep. 1, 2020

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Chika Inoshita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/177,730

(22) Filed: Nov. 1, 2018

(65) Prior Publication Data

US 2019/0164315 A1    May 30, 2019

(30) Foreign Application Priority Data

Nov. 28, 2017 (JP) .................................. 2017-228334
Aug. 7, 2018 (JP) .................................. 2018-148510

(51) Int. Cl.
| | | |
|---|---|---|
| *G06T 11/00* | (2006.01) | |
| *G06T 15/50* | (2011.01) | |
| *B32B 27/20* | (2006.01) | |
| *C09C 1/00* | (2006.01) | |

(52) U.S. Cl.
CPC ............ *G06T 11/001* (2013.01); *G06T 15/50* (2013.01)

(58) Field of Classification Search
CPC combination set(s) only.
See application file for complete search history.

(56) References Cited

U.S. PATENT DOCUMENTS

| 10,220,598 B2* | 3/2019 | Yamane ................... B32B 27/20 |
| 2003/0031870 A1* | 2/2003 | Argoitia ................ C09C 1/0078 |
| | | 428/403 |
| 2018/0043700 A1* | 2/2018 | Totsuka ................... B41M 5/52 |
| 2019/0099781 A1* | 4/2019 | Yamane ................... B05D 5/06 |

FOREIGN PATENT DOCUMENTS

JP           2016215633 A       12/2016

* cited by examiner

*Primary Examiner* — Wesner Sajous
(74) *Attorney, Agent, or Firm* — Canon U.S.A., Inc. I.P. Division

(57) ABSTRACT

An image processing apparatus includes an acquisition unit and a generation unit to generate image data representing an image containing luminous points caused by light reflection on a plurality of flakes contained in a coating material in a case of coating an object with the coating material. The acquisition unit acquires information about the coating material. The generation unit generates the image data representing the image containing the luminous points based on the information about the coating material.

20 Claims, 28 Drawing Sheets

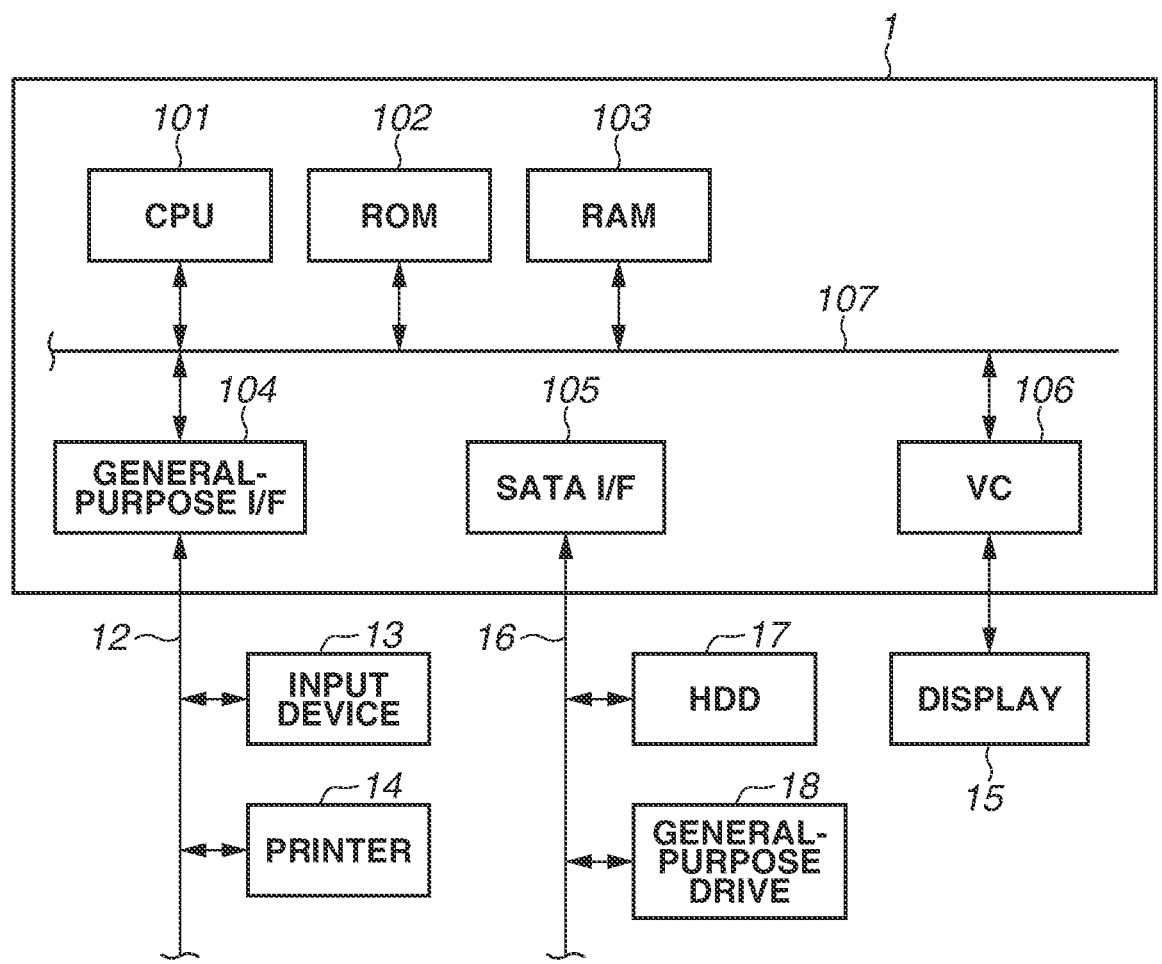

CASE IN WHICH FLAKE
SIZE IS SMALL

CASE IN WHICH FLAKE
SIZE IS LARGE

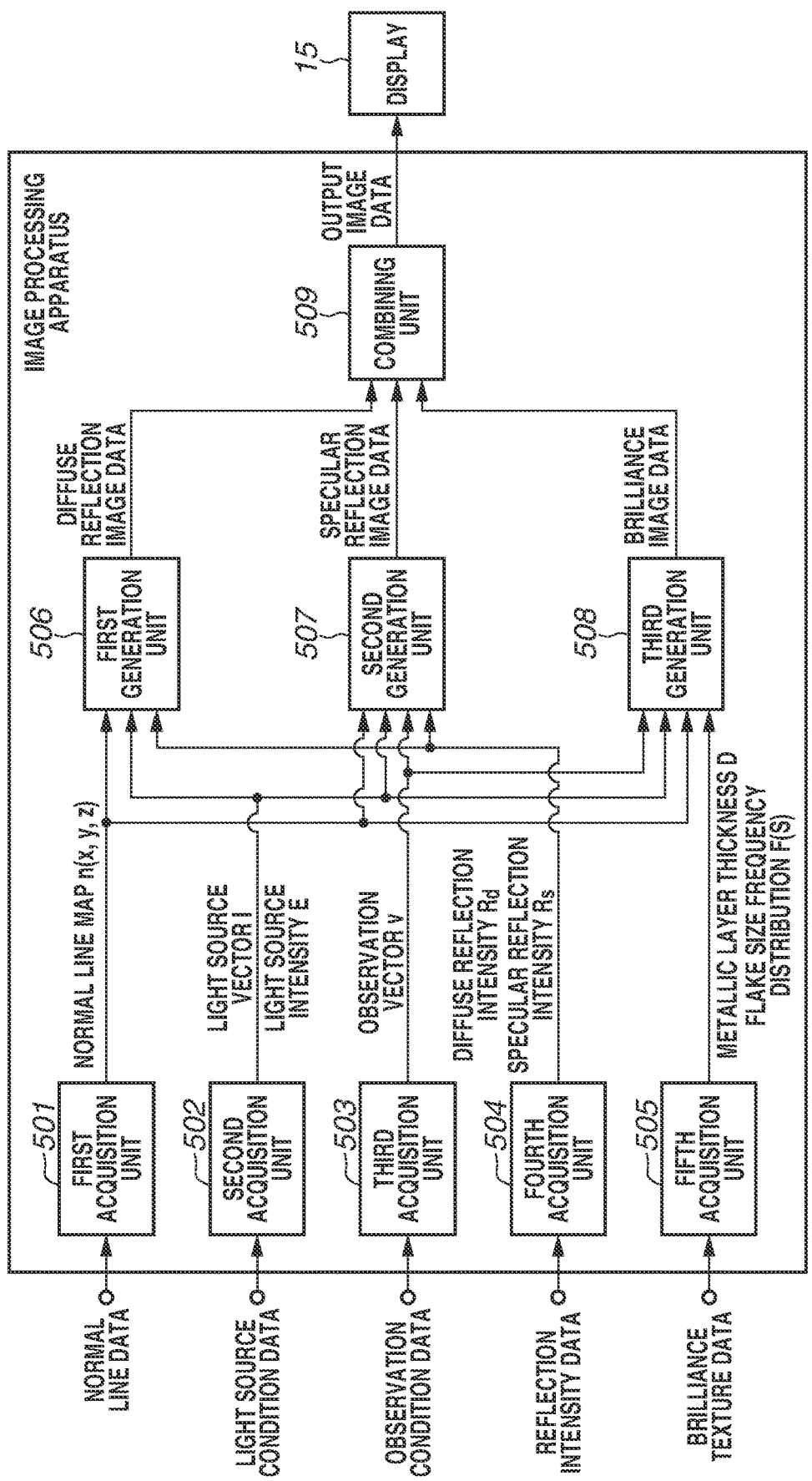

FIG.7

| NORMAL LINE | C:¥shape.obj | REFER |

LIGHT SOURCE CONDITION/OBSERVATION CONDITION

CAMERA POSITION    X [100]   Y [0]   Z [100]

CAMERA ORIENTATION    θ [0]   ρ [0]

CAMERA VIEWING ANGLE    VERTICAL [10] DEGREES   HORIZONTAL [10] DEGREES

LIGHT SOURCE POSITION    X [100]   Y [0]   Z [100]

LIGHT SOURCE ORIENTATION    θ [0]   ρ [0]

LIGHT SOURCE TYPE    [POINT LIGHT SOURCE]

INTENSITY OF LIGHT FROM LIGHT SOURCE    [1000]

REFLECTION INTENSITY

DIFFUSE REFLECTION INTENSITY    R [10]   G [10]   B [10]

SPECULAR REFLECTION INTENSITY    R [10]   G [10]   B [10]

BRILLIANCE TEXTURE

COATING THICKNESS    [10] μm

FLAKE SIZE FREQUENCY DISTRIBUTION

| C:¥flake_size.csv | REFER |

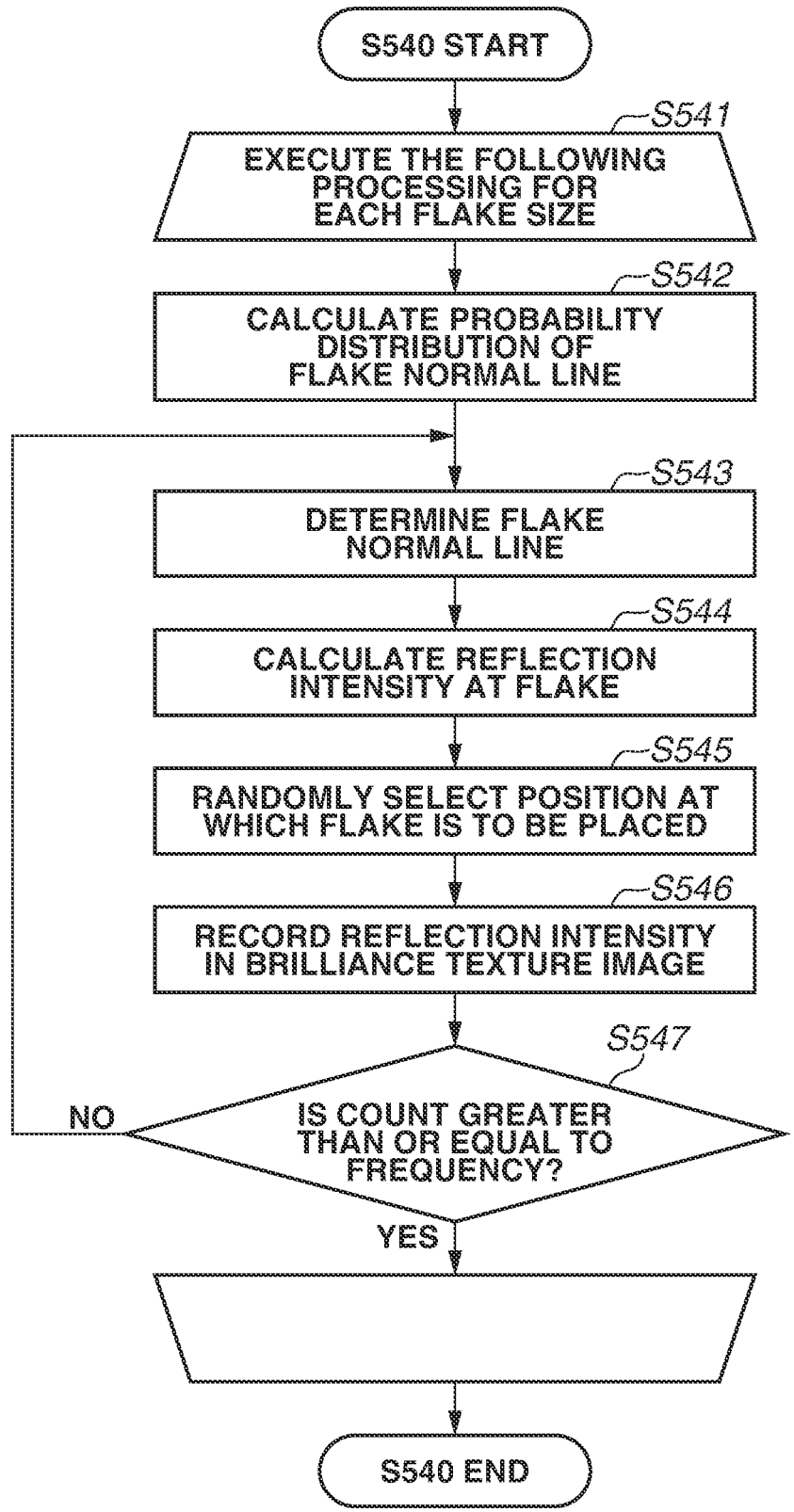

FIG.17

OBJECT SHAPE     C:¥shape.obj     REFER

LIGHT SOURCE CONDITION/OBSERVATION CONDITION

- CAMERA POSITION    X 100   Y 0   Z 100
- CAMERA ORIENTATION    θ 0   ρ 0
- CAMERA VIEWING ANGLE    VERTICAL 10 DEGREES   HORIZONTAL 10 DEGREES
- LIGHT SOURCE POSITION    X 100   Y 0   Z 100
- LIGHT SOURCE ORIENTATION    θ 0   ρ 0
- LIGHT SOURCE TYPE    POINT LIGHT SOURCE
- INTENSITY OF LIGHT FROM LIGHT SOURCE    1000

REFLECTION INTENSITY

- DIFFUSE REFLECTION INTENSITY    R 10   G 10   B 10
- SPECULAR REFLECTION INTENSITY    R 10   G 10   B 10

COATING MATERIAL DATA

- COATING MATERIAL NUMBER    0001:xxxx

FIG.18

| COATING MATERIAL NUMBER | METALLIC LAYER THICKNESS [μm] | FLAKE SIZE FREQUENCY DISTRIBUTION |
|---|---|---|
| 0001 | 50 | 0001.csv |
| 0002 | 100 | 0002.csv |
| ⋮ | ⋮ | ⋮ |
| 9999 | 70 | 9999.csv |

FIG.21

| | | | | | | |
|---|---|---|---|---|---|---|
| OBJECT SHAPE | | C:¥shape.obj | | | REFER | |

LIGHT SOURCE CONDITION/OBSERVATION CONDITION

| | | | | | |
|---|---|---|---|---|---|
| CAMERA POSITION | X 100 | Y 0 | Z 100 | | |
| CAMERA ORIENTATION | θ 0 | ρ 0 | | | |
| CAMERA VIEWING ANGLE | VERTICAL 10 DEGREES | HORIZONTAL 10 DEGREES | | | |
| ILLUMINATION POSITION | X 100 | Y 0 | Z 100 | | |
| ILLUMINATION ORIENTATION | θ 0 | ρ 0 | | | |
| ILLUMINATION TYPE | POINT LIGHT SOURCE | | | | |
| ILLUMINATION INTENSITY | 1000 | | | | |

REFLECTANCE

| | | | |
|---|---|---|---|
| DIFFUSE REFLECTANCE | R 10 | G 10 | B 10 |
| SPECULAR REFLECTANCE | R 10 | G 10 | B 10 |

BRILLIANCE TEXTURE

FLAKE SIZE FREQUENCY DISTRIBUTION

C:¥flake_size.csv    REFER

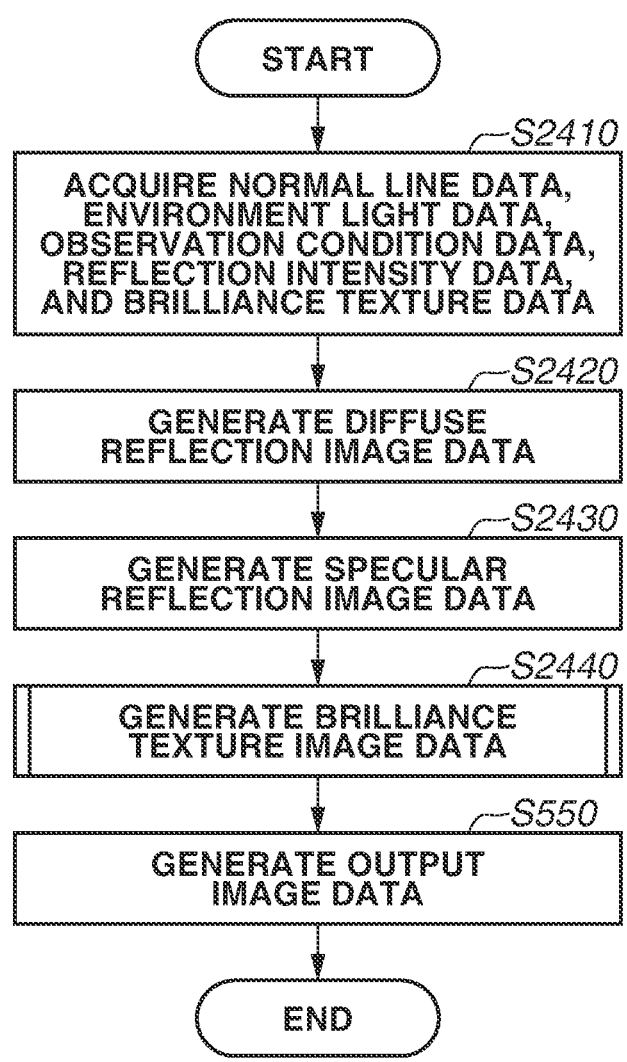

FIG.26A

OBJECT SHAPE     C:¥shape.obj     REFER

ENVIRONMENT LIGHT     C:¥env_light.png     REFER

OBSERVATION CONDITION

CAMERA POSITION     X 100   Y 0   Z 100

CAMERA ORIENTATION     θ 0   ρ 0

CAMERA VIEWING ANGLE     VERTICAL 10 DEGREES   HORIZONTAL 10 DEGREES

REFLECTANCE

DIFFUSE REFLECTANCE     R 10   G 10   B 10

SPECULAR REFLECTANCE     R 10   G 10   B 10

BRILLIANCE TEXTURE

COATING THICKNESS     10 μm

FLAKE SIZE FREQUENCY DISTRIBUTION

C:¥flake_size.csv     REFER

FIG.26B
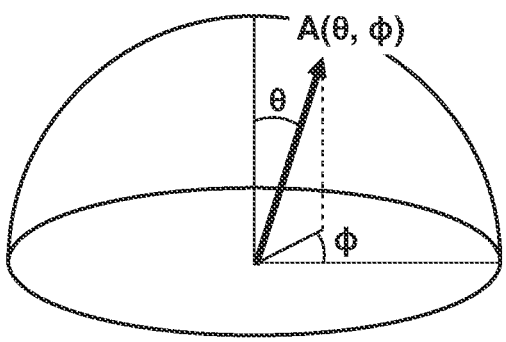
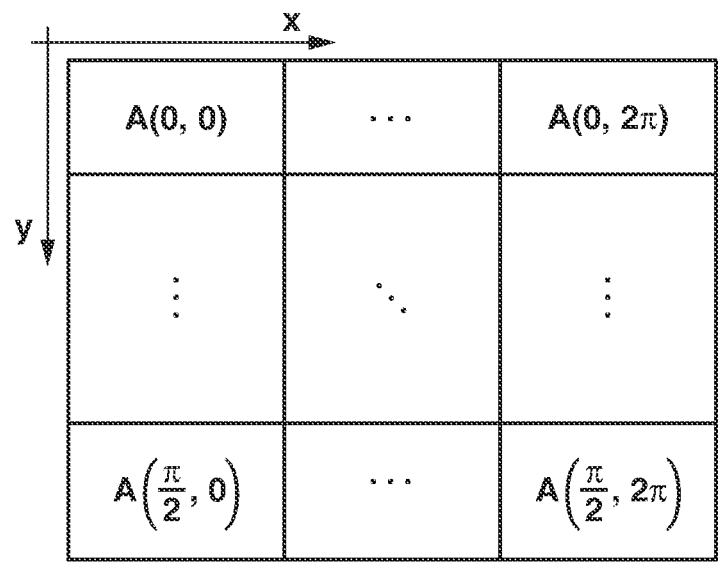

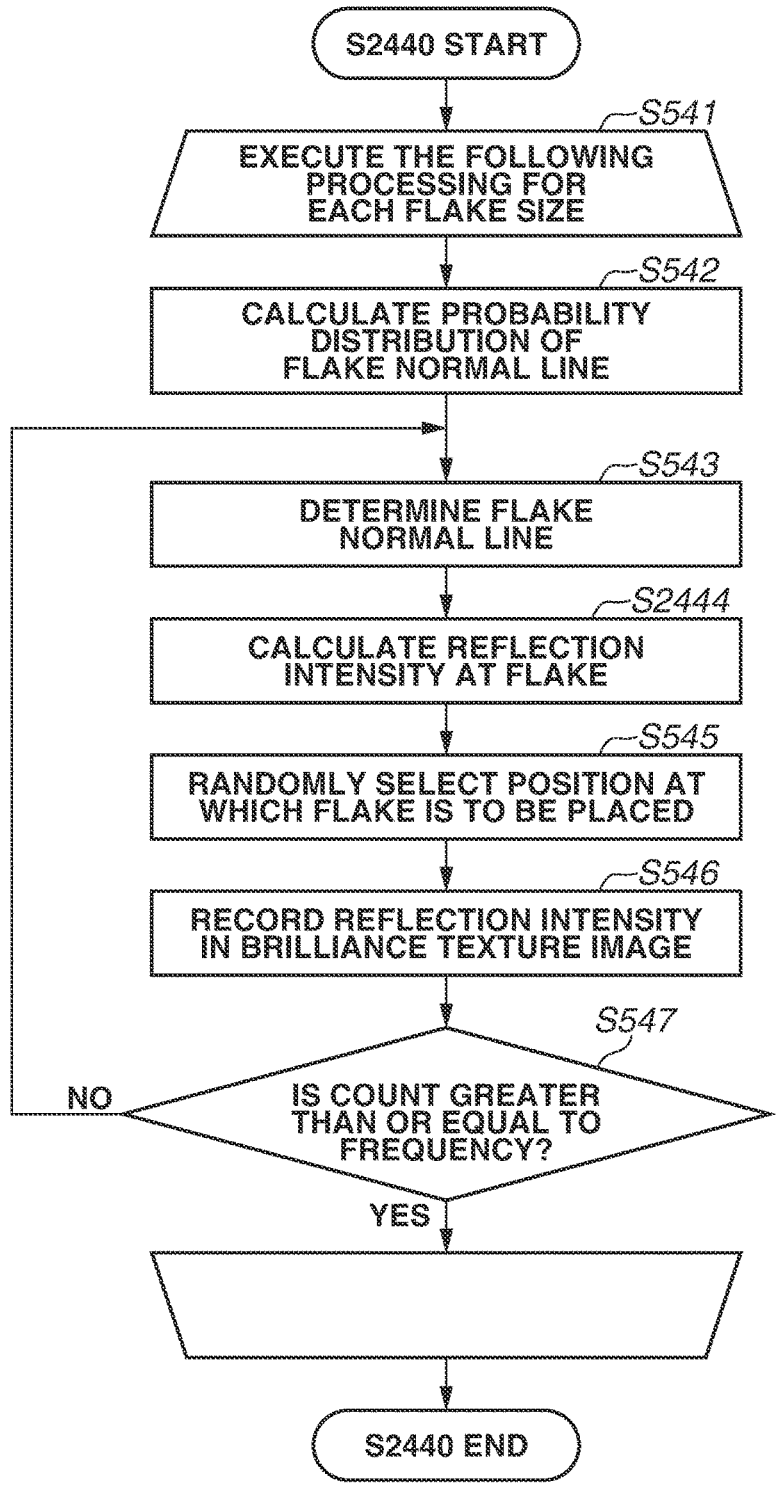

IMAGE PROCESSING APPARATUS, IMAGE PROCESSING METHOD, AND STORAGE MEDIUM

BACKGROUND OF THE INVENTION

Field of the Invention

The present disclosure relates to an image processing technique for expressing sense of sparkle.

Description of the Related Art

In the field of industrial design, it becomes increasingly common to provide a texture to a product surface by coating or decorating the surface or display a texture to be provided to a product using computer graphics (CG). Especially, in order to provide a product with a luxury appearance, the surface of the product is sometimes provided with a characteristic of glitteringly changing the positions of micro-luminous points in response to a change in illumination position and observation angle. Hereinafter, a sensation that is caused by the characteristic of glitteringly changing the positions of the micro-luminous points is referred to as "sense of sparkle". Japanese Patent Application Laid-Open No. 2016-215633 discusses a technique for forming a structure for virtually expressing sense of sparkle on a recording medium based on information indicating the size and number of luminous points.

The technique discussed in Japanese Patent Application Laid-Open No. 2016-215633 expresses sense of sparkle based on the information indicating the size and number of luminous points. However, the size and number of luminous points are information that is can be obtained by observing an object after the object is coated. Thus, there is an issue that sense of sparkle to be generated after the coating is expressible only virtually.

SUMMARY OF THE INVENTION

The present disclosure is directed to image processing technique for virtually expressing sense of sparkle to be generated after an object is coated even before the coating is performed.

According to an aspect of the present disclosure, an image processing apparatus configured to generate image data representing an image containing luminous points caused by light reflection on a plurality of flakes contained in a coating material in a case of coating an object with the coating material includes an acquisition unit configured to acquire information about the coating material, and a generation unit configured to generate the image data representing the image containing the luminous points based on the information about the coating material.

Further features of the present disclosure will become apparent from the following description of embodiments with reference to the attached drawings.

BRIEF DESCRIPTION OF THE DRAWINGS

FIG. 2 is a block diagram illustrating a hardware configuration of an image processing apparatus.

FIG. 5 is a block diagram illustrating a logical configuration of the image processing apparatus.

FIG. 7 illustrates an example of a user interface (UI).

FIG. 8 is a flowchart illustrating a process of generating sparkle image data.

FIG. 17 illustrates an example of the UI.

FIG. 18 illustrates a data configuration of sparkle data.

FIG. 21 illustrates an example of the UI.

FIG. 25 is a flowchart illustrating a process that is executed by the image processing apparatus.

FIGS. 26A and 26B illustrate an example of the UI and an environment map.

FIG. 27 is a flowchart illustrating a process of generating sparkle image data.

DESCRIPTION OF THE EMBODIMENTS

Figure 1:
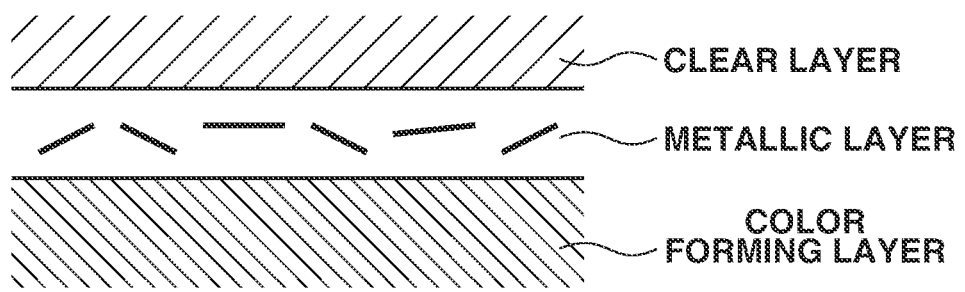
FIG. 1 illustrates a layer structure of a coating layer formed to generate sense of sparkle.

Various embodiments of the present disclosure will be described in detail below. It should be noted that the embodiments described below are not intended to limit the present disclosure. Further, not all combinations of features described in the embodiments are necessarily essential to a technical solution of the present disclosure. Similar components are given the same reference numeral and described.

<Method of Expressing Sense of Sparkle>

A first embodiment is described. FIG. 1 illustrates an example of a coating material layer formed by coating. The coating material layer illustrated in FIG. 1 includes a color forming layer for providing a color, a clear layer for providing gloss, and a metallic layer for expressing sense of sparkle. The metallic layer contains a plurality of thin pieces (flakes) of metal such as aluminum. The flakes are oriented in various directions in the metallic layer, so that the position at which light having been specular-reflected (positive-reflected) on the flakes is visually recognized varies depending on an observation position. This characteristic provides an observer with a sensation that the coated object glitteringly shines (sense of sparkle). Examples of the coating described above include spray coating with respect to a vehicle body and coating by a printer using a metallic ink as a coating material.

Figure 3A:
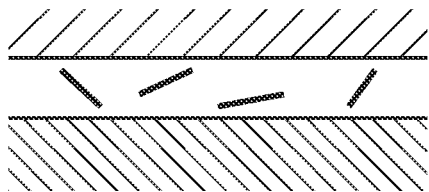
FIGS. 3A and 3B illustrate a layer structure of the coating layer for each flake size.
Figure 3B:
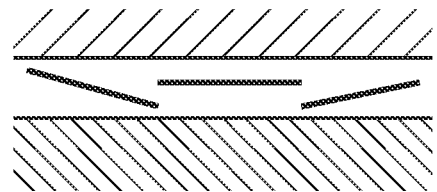
Figure 4A:
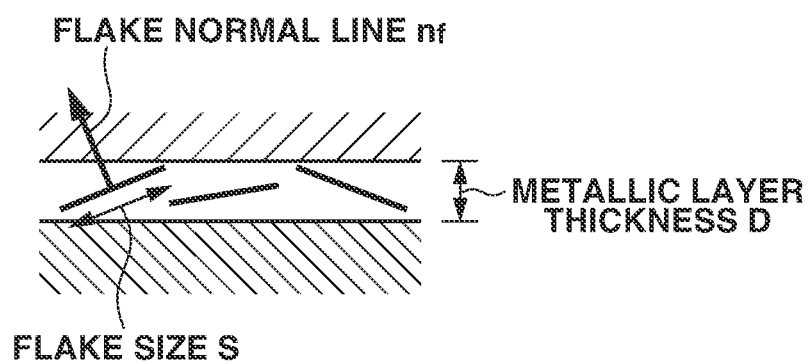
FIGS. 4A and 4B illustrate parameters relating to a metallic layer constituting the coating layer.
Figure 4B:
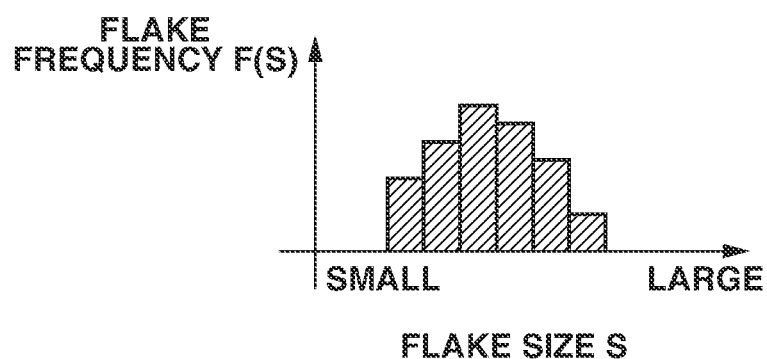

The orientation of each flake contained in the metallic layer is restricted by the layer thickness and flake size. FIGS. 3A and 3B illustrate the layer structure of the coating layer for different flake sizes. FIG. 3A illustrates a case in which each flake size is smaller than the thickness of the metallic layer, whereas FIG. 3B illustrates a case in which each flake size is greater than the thickness of the metallic layer. In the case in which each flake size is smaller than the layer thickness as in FIG. 3A, each flake can be oriented freely in various directions. On the other hand, in the case in which each flake size is greater than the layer thickness as in FIG. 3B, the orientation of each flake is restricted by the layer thickness. Based on this point of view, data for expressing sense of sparkle is generated by a process using information that indicates the thickness of the metallic layer and the flake size in the present embodiment. More specifically, the direction of a normal with respect to a flake surface is calculated based on information indicating the thickness of the metallic layer and a flake size frequency distribution, and the direction in which specular reflection occurs under a predetermined geometric condition is identified based on the calculated normal direction. FIGS. 4A and 4B illustrate parameters regarding the metallic layer constituting the coating layer. A normal $n_f$ with respect to the flake surface is calculated using a thickness D of the metallic layer and a flake size S illustrated in FIG. 4A. However, the metallic layer contains a plurality of flakes of different sizes, so that in order to obtain both the flake size S and the flake amount for each flake size S, a flake size frequency distribution F(S) illustrated in FIG. 4B is used in the calculation of the normal nf. In the present embodiment, the flakes are disk-shaped flakes, and the flake size is the diameter of the circle.

The process using the information indicating the thickness of the metallic layer and the flake size frequency distribution as described above is employed so that sense of sparkle can be expressed without inputting the parameters, such as the sizes and number of luminous points, for each geometric condition. This allows the user to check the sense of sparkle to be generated after coating is performed, regardless of whether the coating is already performed or is to be performed, by inputting the thickness of the coating layer and the sizes of flakes contained in the coating material.

<Hardware Configuration of Image Processing Apparatus 1>

FIG. 2 is a block diagram illustrating a hardware configuration of an image processing apparatus 1. The image processing apparatus 1 is, for example, a computer and includes a central processing unit (CPU) 101, a read-only memory (ROM) 102, a random access memory (RAM) 103, a general-purpose interface (I/F) 104, a serial advanced technology attachment (SATA) I/F 105, and a video card (VC) 106. The CPU 101 executes an operating system (OS) and various programs stored in the ROM 102, a hard disk drive (HDD) 17, etc. using the RAM 103 as a work memory. Further, the CPU 101 controls the respective components via a system bus 107. Further, the CPU 101 loads program codes stored in the ROM 102, the HDD 17, etc. into the RAM 103 and executes the loaded program codes to realize a process illustrated in a flowchart described below. The general-purpose I/F 104 is connected with an input device 13, such as a mouse and a keyboard, and a printer 14 via a serial bus 12. The SATA I/F 105 is connected with the HDD 17 and a general-purpose drive 18 for reading from and writing to various recording mediums via a serial bus 16. The CPU 101 uses the HDD 17 and the various recording mediums mounted on the general-purpose drive 18 as various data storage locations. The VC 106 is connected with a display 15. The CPU 101 displays a UI provided by a program on the display 15 and receives input information indicating a user instruction acquired via the input device 13. The image processing apparatus 1 can be included in the display 15 or the printer 14.

<Logical Configuration of Image Processing Apparatus 1>

FIG. 5 is a block diagram illustrating a logical configuration of the image processing apparatus 1. The CPU 101 executes a computer program read into the RAM 103 from the ROM 102, etc. to implement the processing of each unit described below as software. Not all the processing described below needs to be executed by the CPU 101, and the image processing apparatus 1 can be configured in such a manner that a processing circuit or a plurality of processing circuits other than the CPU 101 performs part of or entire processing.

The image processing apparatus 1 includes first to fifth acquisition units 501 to 505, first to third generation units 506 to 508, and a combining unit 509. The first acquisition unit 501 acquires normal data representing the distribution of normals with respect to the object surface. The second acquisition unit 502 acquires light source condition data representing a light source vector indicating the direction from the object to a light source and the intensity of light emitted from the light source. The third acquisition unit 503 acquires observation condition data representing an observation vector indicating the direction from the object to an observer (camera). The fourth acquisition unit 504 acquires reflection intensity data representing the reflection intensities of diffuse reflection and specular reflection of the object. The fifth acquisition unit 505 acquires sparkle data representing the thickness of the coating layer and the flake size frequency distribution. The first generation unit 506 generates diffuse reflection image data representing the intensity of diffuse reflection light obtained under a user-set geometric condition, based on the normal data, the light source condition data, and the reflection intensity data. The intensity of the diffuse reflection light is recorded in each pixel of a diffuse reflection image represented by the diffuse reflection image data. The second generation unit 507 generates specular reflection image data representing the intensity of specular reflection light obtained under the user-set geometric condition, based on the normal data, the light source condition data, the observation condition data, and the reflection intensity data. The intensity of the specular reflection light is recorded in each pixel of a specular reflection image represented by the specular reflection image data. The third generation unit 508 generates sparkle image data for expressing sense of sparkle, based on the normal data, the light source condition data, the observation condition data, and the sparkle data. The intensity of light that is specular-reflected on the flakes under the user-set geometric condition is recorded in each pixel of a sparkle image represented by the sparkle image data. The combining unit 509 calculates the sum of a diffuse reflection component of the reflection light, a specular reflection component of the reflection light, and a sparkle component for expressing the sense of sparkle, based on the diffuse reflection image data, the specular reflection image data, and the sparkle image data. Further, the combining unit 509 generates output image data representing an output image in which the calculated sum is recorded in each pixel. More specifically, pixel values of the respective pieces of image data are added to calculate pixel values of the output image. Further, the pixel values can be weighted and then added in order to further emphasize the sense of sparkle.

<Process Executed by Image Processing Apparatus 1>

Figure 6:
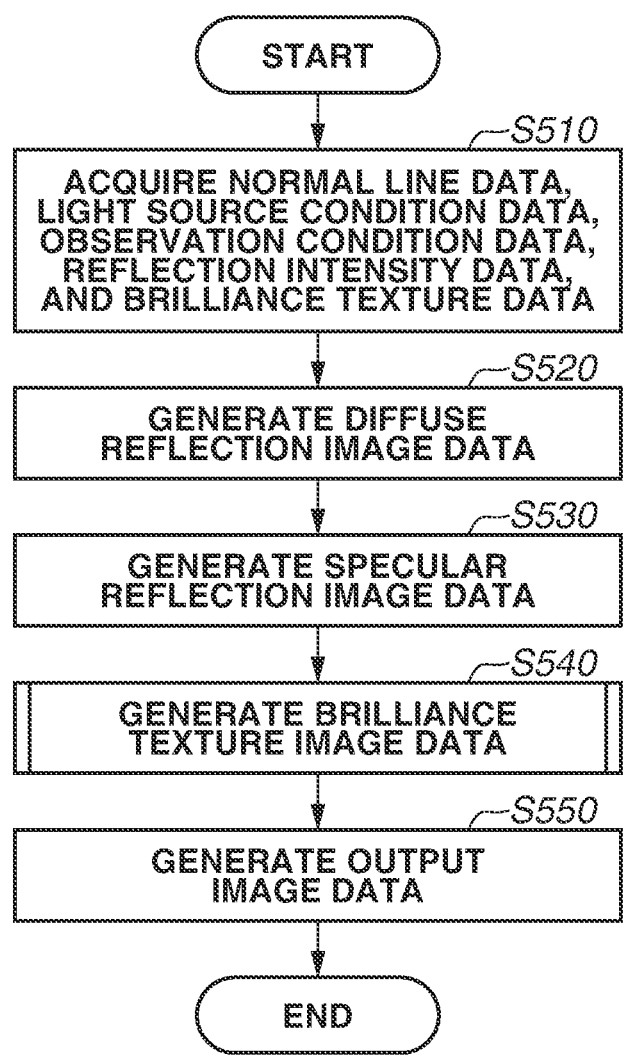
FIG. 6 is a flowchart illustrating a process executed by the image processing apparatus.

FIG. 6 is a flowchart illustrating a process executed by the image processing apparatus 1. Details of the process executed by the image processing apparatus 1 will be described, with reference to FIG. 6. The process described below is started if a user instruction via the input device 13 is received.

In step S510, the first to fifth acquisition units 501 to 505 each acquire data based on the user instruction. More specifically, the first acquisition unit 501 acquires the normal data. The second acquisition unit 502 acquires the light source condition data. The third acquisition unit 503 acquires the observation condition data. The fourth acquisition unit 504 acquires the reflection intensity data. The fifth acquisition unit 505 acquires the sparkle data. The normal data is a normal map $n(x, y, z)=(n_x, n_y, n_z)$ representing the distribution of three-dimensional vectors representing the gradient of a surface at position (x, y, z). The normal map is generated in advance by acquiring the object shape using a method of imaging the object to which specific pattern light is projected or a method using a laser scanner, and calculating the normals based on the object shape. The light source condition data is data representing a light source vector $l=(l_x, l_y, l_z)$ indicating the orientation from a position at the object to a position of the light source, and an intensity E of light emitted from the light source. The light source vector l is calculated based on the position, orientation, and type of the light source that are acquired via the UI illustrated in FIG. 7. For example, in a case in which the type of the light source is a point light source, the light source vector l is calculated using the position of the light source. On the other hand, in a case in which the light source is a parallel light source such as a planar light source, the light source vector l is calculated using the direction of the light source. Alternatively, the light source vector l that is input via the UI may directly be acquired. The observation condition data is data representing an observation vector $v=(v_x, v_y, v_z)$ indicating the orientation from a position of the object to the observation position. The observation vector is calculated based on the position, orientation, and viewing angle of the camera that are input via the UI in FIG. 7. More specifically, the observation vector v is calculated by calculating the pixel position (u, v) on an image that corresponds to the position (x, y, z) using the position, orientation, and viewing angle of the camera. Alternatively, the observation vector v that is input via the UI may directly be acquired. The reflection intensity data is data representing a diffuse reflection intensity $R_d$ and a specular reflection intensity $R_s$. The sparkle data is data representing the thickness D of the metallic layer and the flake size frequency distribution F(S).

In step S520, the first generation unit 506 generates the diffuse reflection image data representing a diffuse reflection image $I_d$, based on the normal map n(x, y, z), the light source vector l, a light source intensity E, and the diffuse reflection intensity $R_d$ acquired in step S510. A pixel value of the diffuse reflection image $I_d$ is denoted by $I_d(u, v)$. As used herein, (u, v) refers to the pixel position on the image that corresponds to the position (x, y, z). Details of the processing of generating the diffuse reflection image data will be described below.

In step S530, the second generation unit 507 generates the specular reflection image data representing a specular reflection image $I_s$, based on the normal map n(x, y, z), the light source vector l, the light source intensity E, the observation vector v, and the specular reflection intensity $R_s$ acquired in step S510. A pixel value of the specular reflection image $I_s$ is denoted by $I_s(u, v)$. Details of the processing of generating the specular reflection image data will be described below.

In step S540, the third generation unit 508 generates the sparkle image data based on the normal map n(x, y, z), the light source vector l, the light source intensity E, the observation vector v, the thickness D of the metallic layer, and the flake size frequency distribution F(S) acquired in step S510. A pixel value of a sparkle image $I_f$ represented by the sparkle image data is denoted by $I_f(u, v)$. Details of the processing of generating the sparkle image data will be described below.

In step S550, the combining unit 509 calculates the sum of $I_d(u, v)$, $I_s(u, v)$, and $I_f(u, v)$ for each pixel and generates the output image data representing an output image $I_{out}$ in which the calculated sum $I_{out}(u, v)$ is recorded in each pixel. Further, the combining unit 509 outputs the generated output image data to the display 15. Details of the processing of generating the output image data will be described below.

<Processing of Generating Diffuse Reflection Image Data>

In step S520, the first generation unit 506 calculates each pixel value $I_d(u, v)$ of the diffuse reflection image $I_d$, based on the normal map n(x, y, z), the light source vector l, the light source intensity E, and the diffuse reflection intensity $R_d$ acquired in step S510. More specifically, $I_d(u, v)$ is calculated using formula (1) based on the Lambert's cosine law.

$$I_d(u,v)=E \times R_d \times \mathrm{dot}(n(x,y,z),l) \quad (1),$$

where dot(n(x, y, z), l) denotes an inner product operation of the normal map n(x, y, z) and the light source vector l and is replaced by 0 if the inner product is negative.

<Processing of Generating Specular Reflection Image Data>

In step S530, the second generation unit 507 calculates each pixel value $I_s(u, v)$ of the specular reflection image $I_s$, based on the normal map n(x, y, z), the light source vector l, the light source intensity E, the observation vector v, and the specular reflection intensity $R_s$ acquired in step S510. More specifically, $I_s(u, v)$ is calculated using formula (2) based on the Blinn-Phong model, $$I_s(u,v)=E \times R_s \times \mathrm{dot}(n(x,y,z),h)^n \quad (2),$$

where, h is the half vector of the light source vector l and the observation vector v and is calculated from h=(1+v)/|1+v|. The constant n is a value that represents the degree of spread of specular reflection, and as the value becomes greater, the spread of the specular reflection becomes smaller. As the constant n, a value based on a user instruction via the UI illustrated in FIG. 7 may be used, or a predetermined value may be used.

<Processing of Generating Sparkle Image Data>

In step S540, the third generation unit 508 calculates a pixel value $I_f(u, v)$ based on the normal map n(x, y, z), the light source vector l, the light source intensity E, the observation vector v, the thickness D of the metallic layer, and the flake size frequency distribution F(S) acquired in step S510. More specifically, in a state in which there are physical constraints on the flake orientation due to the thickness of the metallic layer, the position and orientation of each flake contained in the metallic layer are randomly determined to generate the sparkle image data in which the layer structure is taken into consideration. FIG. 8 is a flowchart illustrating processing executed by the third generation unit 508 in step S540. The processing of generating the sparkle image data is described in detail with reference to FIG. 8.

In step S541, the third generation unit 508 refers to the flake size frequency distribution F(S) acquired in step S510 and executes steps S542 to S547 for each flake size S.

Figure 9:
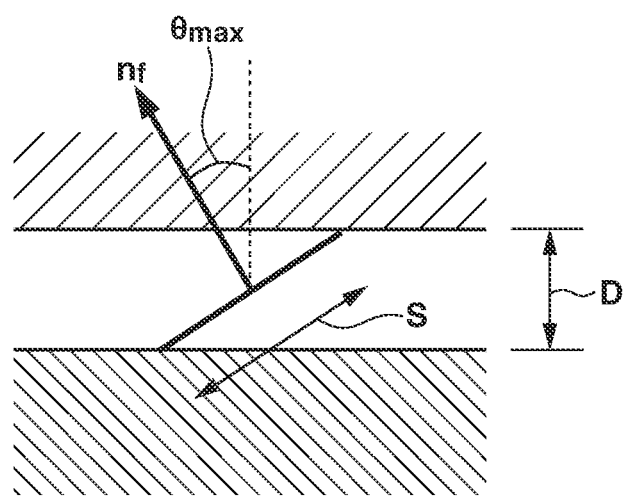
FIG. 9 illustrates a gradient of a flake in the metallic layer.

In step S542, the third generation unit 508 calculates a probability distribution of the normal (hereinafter, "flake normal") with respect to the flake surface based on the flake size S to which the third generation unit 508 refers in step S541 and the thickness D of the metallic layer acquired in step S510. The probability distribution of the flake normal indicates the possible orientations of a flake of the flake size S in the metallic layer. Since the flake orientation is restricted by the thickness D of the metallic layer, first, the maximum angle at which the flake can be inclined in the metallic layer is calculated. A flake normal $n_f$ is expressed by formula (3), $$n_r = (\cos \phi \sin \theta, \sin \phi \sin \theta, \cos \theta) \quad (3),$$

where, $\theta$ and $\phi$ are respectively zenith and azimuth angles of a spherical coordinate system. The maximum angle at which the flake can be inclined in the metallic layer is an angle at which the flake is placed so that the ends of the flake are respectively in contact with upper and lower surfaces of the metallic layer as illustrated in FIG. 9. Thus, the maximum value $\theta_{max}$ of possible zenith angles of the flake normal $n_f$ is calculated from formula (4), $$\theta_{max} = \operatorname{asin}\left(\frac{D}{S}\right). \quad (4)$$

The azimuth angle $\phi$ is not restricted by the thickness D of the metallic layer. Accordingly, the flake normal $n_f$ exists within the zenith angle $\theta$ range and the azimuth angle $\phi$ range specified by formula (5), $$0 \theta \leq \theta_{max}$$
$$0 \leq \phi \leq 2\pi \quad (5).$$

The flake can be oriented freely within the above value ranges, so that the probability distribution $p(\theta)$ of the zenith angle $\theta$ and the probability distribution $p(\phi)$ of the azimuth angle $\phi$ are expressed by formula (6), $$p(\theta) = \frac{1}{\theta_{max}} \quad (6)$$
$$p(\phi) = \frac{1}{2\pi}.$$

In step S543, the third generation unit 508 calculates the flake normal $n_f$ by randomly determining $\theta$ and $\phi$ based on the probability distributions $p(\theta)$ and $p(\phi)$ calculated in step S542. Random number values $r_\theta$ and $r_\phi$ are set in the range of 0 to 1 independently with respect to $\theta$ and $\phi$, and $\theta$ and $\phi$ with which the cumulative distribution functions of the probability distributions $p(\theta)$ and $p(\phi)$ and the random number values $r_\theta$ and $r_\phi$ respectively match are selected to obtain $\theta$ and $\phi$ corresponding to the probability distributions $p(\theta)$ and $p(\phi)$. The relationship between the cumulative distribution functions of the probability distributions $p(\theta)$ and $p(\phi)$ and the random number values $r_\theta$ and $r_\phi$ is expressed by formula (7), $$r_\theta = \int_0^\theta \frac{1}{\theta_{max}} d\theta \quad (7)$$

$$r_\phi = \int_0^\phi \frac{1}{2\pi} d\phi.$$

Based on the relationship between the random number values $r_\theta$ and $r_\phi$ and the cumulative distribution functions that is expressed by formula (7), $\theta$ and $\phi$ are calculated as expressed by formula (8), $$\theta = r_\theta \theta_{max}$$
$$\phi = r_\phi 2\pi \quad (8).$$

The flake normal $n_f$ representing the flake orientation is calculated by substituting $\theta$ and $\phi$ calculated using formula (8) into formula (1).

In step S544, the third generation unit 508 calculates the intensity (reflection intensity) of light reflected on the flake, based on the flake normal $n_f$ calculated in step S543. On the flakes, specular reflection occurs as on a metal, so that the spread of reflection light is not taken into consideration and a reflection intensity $i_f$ is calculated based on the model expressed by formula (9), $$i_f = E \times \delta(|n_f - h|) \quad (9),$$

where $\delta(x)$ is a delta function and has a value as specified by formula (10), $$\delta(x) = \begin{cases} 1 & (x = 0) \\ 0 & (x \neq 0) \end{cases}. \quad \text{formula (10)}$$

According to the model expressed by formula (9), the reflection intensity $i_f$ has a value in a case where the light source vector and the observation vector satisfy a geometric condition of specular reflection, whereas the reflection intensity $i_f$ is zero in other cases. In this way, the characteristic that the positions of luminous points change in response to a change in the geometric condition can be expressed.

In step S545, the third generation unit 508 determines a position in the normal data at which the flake is to be placed. The third generation unit 508 randomly selects a position (x, y, z) at which the flake is to be placed, from positions (x, y, z) in the normal data. Alternatively, arrangement data representing positions at which the flake is to be placed randomly is generated in advance and the arrangement may be determined by acquiring the arrangement data. The processing in step S545 is not the processing of determining positions at which the flake is to be placed actually but the processing of determining positions at which the flake is to be placed virtually so that the position of a luminous point corresponding to the flake can be determined in the next step (step S546).

In step S546, the third generation unit 508 records the reflection intensity $i_f$ calculated in step S544 in the sparkle image $I_f$. More specifically, in a case in which the flake of the flake size S is placed in the orientation of the normal $n_f$ with the flake arrangement position (x, y, z) acquired in step S545 being the center, the third generation unit 508 records the reflection intensity $i_f$ according to the function expressed by formula (11), $$I_f(u,v) = A((u,v), n_f, S) i_f \quad (11),$$

where $A((u, v), n_f, S)$ is a function that returns zero in a case in which the flake placed at the position (x, y, z) selected randomly in step S545 is not observed at the position (u, v) on the image. On the other hand, in a case in which the flake is observed at the position (u, v) on the image, A((u, v), $n_f$, S) returns the proportion t of the flake with respect to the pixel size of the position (u, v) on the image. In this way, the reflection intensity $i_f$ can be recorded in the sparkle image $I_f$ even if the flake is placed over a plurality of pixels on the image. Further, after the reflection intensity $i_f$ is recorded, one is added to the count as one flake is placed. The number of placed flakes is counted for each flake size S. Further, the initial value of each count is zero. By the processing in step S546, the random arrangement of the luminous point corresponding to the flake is determined.

In step S547, the third generation unit 508 judges whether the count representing the number of placed flakes of the flake size S reaches the frequency of the referenced flake size S. If the count is greater than or equal to the frequency of the referenced flake size S (YES in step S547), the processing returns to step S541, and steps S542 to 547 are executed by referring to a different flake size S. On the other hand, if the count is less than the frequency of the referenced flake size S (NO in step S547), steps S543 to S546 are executed again, and the reflection intensity $i_f$ corresponding to the flake of the flake size S is recorded in the sparkle image Ir.

<Processing of Generating Output Image Data>

In step S550, the combining unit 509 calculates the sum $I_{out}(u, v)$ of the pixel values of the diffuse reflection image $I_d$, the specular reflection image $I_s$, and the sparkle image $I_f$ and generates output image data representing the output image $I_{out}$. More specifically, the sum $I_{out}(u, v)$ of the pixel values of the output image $I_{out}$ is calculated using formula (12). In the present embodiment, in order to calculate the pixel values for each of red (R), green (G), and blue (B), the pixel values of the respective R, G, and B channels of the sparkle image $I_f$ are assumed to be equal, to calculate the sum.

$$I_{out}(u,v)=I_d(u,v)+I_s(u,v)+I_f(u,v) \quad \text{formula (12)}.$$

Further, the generated output image data is output to the display 15.

Benefit of First Embodiment

As described above, the image processing apparatus according to the present embodiment calculates flake orientation information based on the layer thickness and the flake size. Further, the image processing apparatus generates data for expressing sense of sparkle based on the calculated information. In this way, the sense of sparkle is expressible by inputting the parameters acquired before an object is coated. Therefore, the sense of sparkle that occurs after an object is coated is virtually expressible even before the object is coated.

In the first embodiment, the example is described in which the image representing the reflection intensity corresponding to the input geometric condition is generated. In a second embodiment, an example will be described in which an image for expressing sense of sparkle is generated based on a reflection characteristic and a geometric condition after the reflection characteristic at each position of an object is calculated. As to a process in the present embodiment, it is not necessary to execute the entire process again each time the geometric condition is changed. A hardware configuration of the image processing apparatus 1 according to the present embodiment is similar to that according to the first embodiment, so that the description thereof is omitted. In the following description, a difference between the present embodiment and the first embodiment will be mainly described.

<Logical Configuration of Image Processing Apparatus 1>

Figure 10:
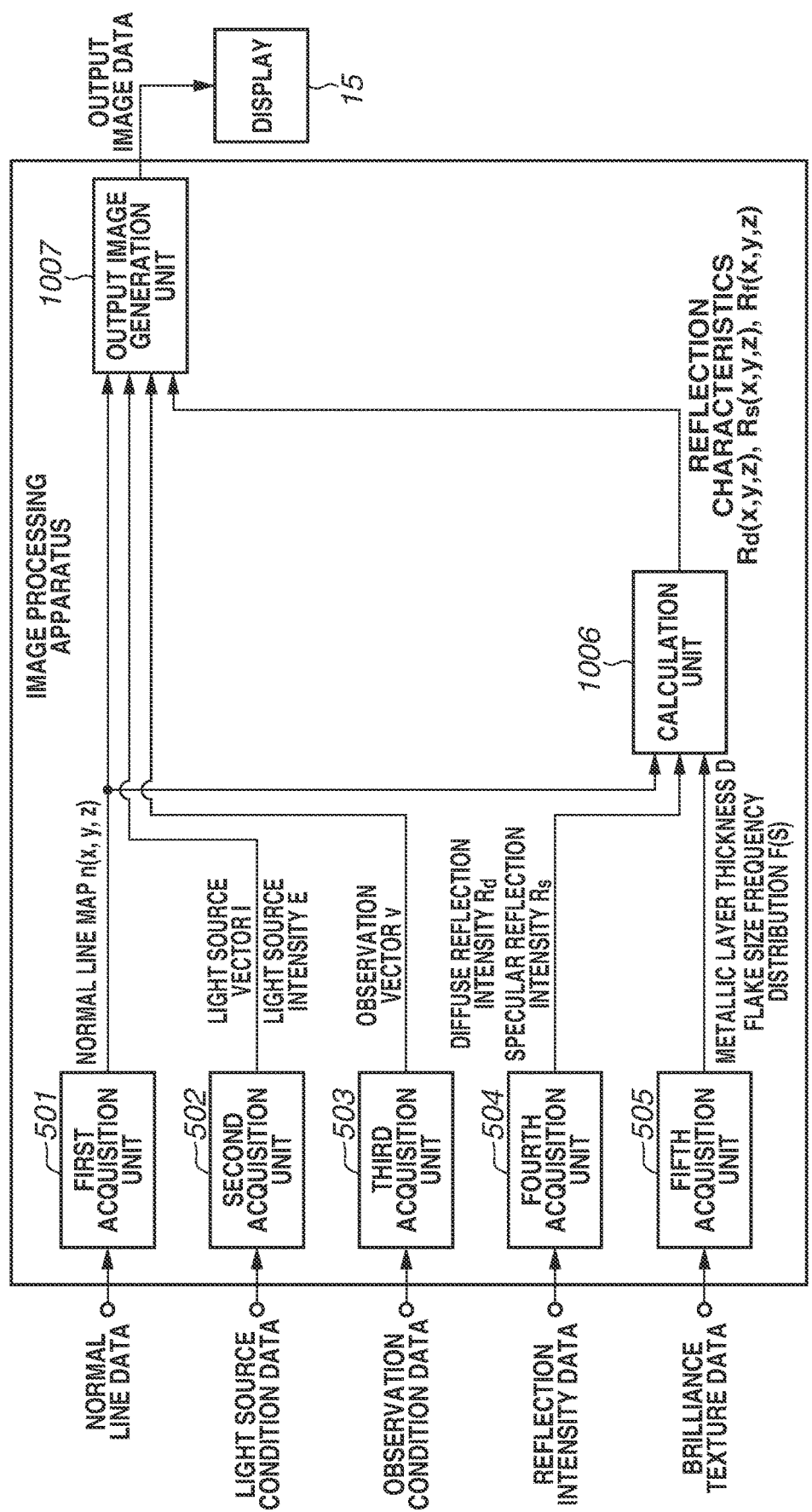
FIG. 10 is a block diagram illustrating a logical configuration of the image processing apparatus.

In the following description, a process executed by the image processing apparatus 1 according to the present embodiment will be described, with reference to FIG. 10. FIG. 10 is a block diagram illustrating a logical configuration of the image processing apparatus 1. The CPU 101 executes a computer program read into the RAM 103 from the ROM 102 or the like to implement the processing of each unit described below as software. Not all the processing described below needs to be executed by the CPU 101, and the image processing apparatus 1 may be configured in such a manner that a processing circuit or a plurality of processing circuits other than the CPU 101 performs part of or entire processing.

The image processing apparatus 1 includes the first to fifth acquisition units 501 to 505, a calculation unit 1006, and an output image generation unit 1007. The first to fifth acquisition units 501 to 505 are similar to those in the first embodiment, so that the description thereof is omitted. The calculation unit 1006 calculates a reflection characteristic at each position on the object based on the normal data, the reflection intensity data, and the sparkle data. The output image generation unit 1007 generates image data representing an image for expressing sense of sparkle, based on the normal data, the light source condition data, the observation condition data, and the calculated reflection characteristics.

<Process Executed by Image Processing Apparatus 1>

Figure 11:
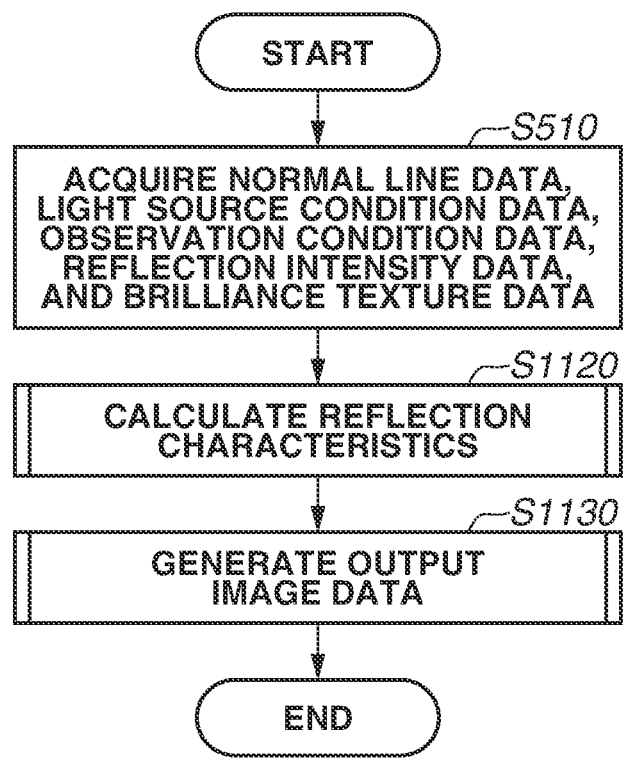
FIG. 11 is a flowchart illustrating a process executed by the image processing apparatus.

FIG. 11 is a flowchart illustrating a process executed by the image processing apparatus 1. In the following description, details of the process executed by the image processing apparatus 1 will be described with reference to FIG. 11. The process described below is started when a user instruction via the input device 13 is received.

Step S510 is similar to that in the first embodiment, so that the description thereof is omitted.

In step S1120, the calculation unit 1006 calculates the reflection characteristic at each position in the normal map n(x, y, z) based on the normal map n(x, y, z), the diffuse reflection intensity $R_d$, the specular reflection intensity $R_s$, the thickness D of the metallic layer, and the flake size frequency distribution F(S). More specifically, diffuse reflection intensity data on diffuse reflection, specular reflection intensity data on specular reflection at the object surface, and brilliance reflection data on specular reflection at the flake surface are calculated as the reflection characteristics of the object. Details of the reflection characteristic calculation processing will be described below.

In step S1130, the output image generation unit 1007 generates the output image data for expressing sense of sparkle based on the normal map n(x, y, z), the light source vector l, the light source intensity E, the observation vector v, and the reflection characteristics calculated in step S1120. Further, the output image generation unit 1007 outputs the output image data to the display 15. Details of the output image data generation processing will be described below.

<Reflection Characteristic Calculation Processing>

Figure 12:
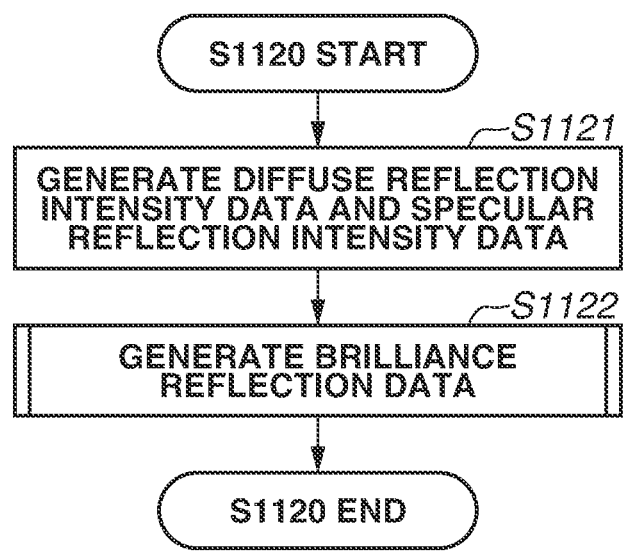
FIG. 12 is a flowchart illustrating a process of calculating a reflection characteristic.

In step S1120, the calculation unit 1006 calculates the reflection characteristic at each position in the normal map n(x, y, z) based on the normal map n(x, y, z), the diffuse reflection intensity Rd, the specular reflection intensity Rs, the thickness D of the metallic layer, and the flake size frequency distribution F(S). FIG. 12 is a flowchart illustrating a process that is executed by the calculation unit 1006 in step S1120. The reflection characteristic calculation processing is described below with reference to FIG. 12.

In step S1121, the calculation unit 1006 generates the diffuse reflection intensity data $R_d(x, y, z)$ and the specular reflection intensity data $R_s(x, y, z)$ with respect to the normal map $n(x, y, z)$. More specifically, the diffuse reflection intensity data $R_d(x, y, z)$ is data that represents a table in which the respective positions in the normal map $n(x, y, z)$ are associated with the diffuse reflection intensities at the respective positions in the normal map $n(x, y, z)$. The specular reflection intensity data $R_s(x, y, z)$ is data that represents a table in which the respective positions in the normal map $n(x, y, z)$ are associated with the specular reflection intensities at the respective positions in the normal map $n(x, y, z)$. In the present embodiment, the diffuse reflection intensity data $R_d(x, y, z)$ and the specular reflection intensity data $R_s(x, y, z)$ are generated based on the diffuse reflection intensity $R_d$ and the specular reflection intensity $R_s$ acquired in step S510 using formula (13), $$R_d(x,y,z)=R_d$$

$$R_s(x,y,z)=R_s \quad (13).$$

The reflection intensities associated with the respective positions in the normal map $n(x, y, z)$ may differ for each position $(x, y, z)$.

Figure 13:
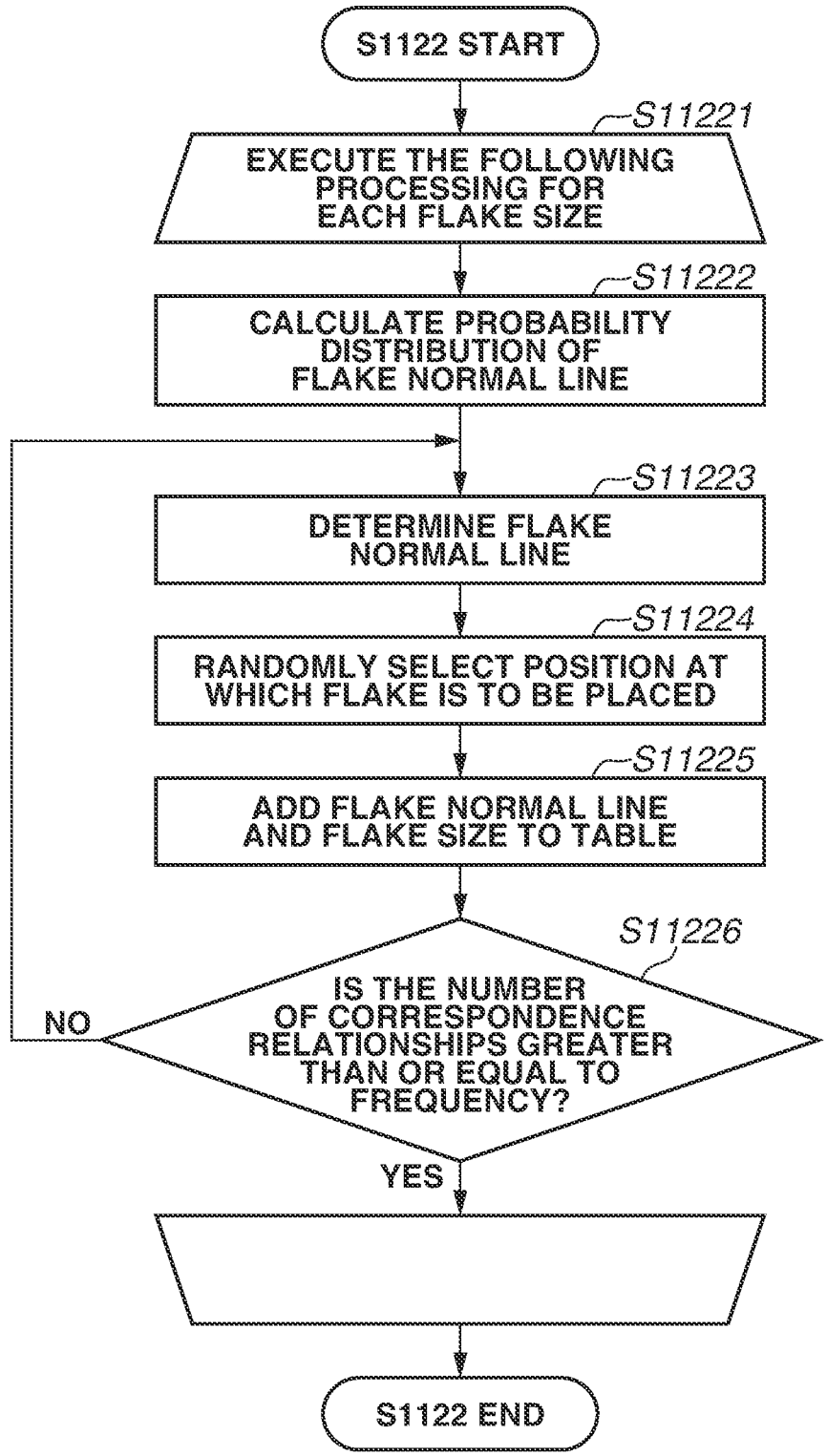
FIG. 13 is a flowchart illustrating a process of expressing sense of sparkle.

In step S1122, the calculation unit 1006 generates the brilliance reflection data $R_f(x, y, z)$ with respect to the normal map $n(x, y, z)$. More specifically, the brilliance reflection data $R_f(x, y, z)$ is data that represents a table in which the respective positions in the normal map $n(x, y, z)$ are associated with the flake normals and the flake sizes at the respective positions in the normal map $n(x, y, z)$. The details of the processing in step S1122 is described below with reference to FIG. 13. FIG. 13 is a flowchart illustrating a process of generating the brilliance reflection data.

In step S11221, the calculation unit 1006 refers to the flake size frequency distribution F(S) acquired in step S510 and executes the processing in steps S11222 to S11226 for each flake size S.

In step S11222, the calculation unit 1006 calculates the probability distribution of the flake normal based on the flake size S to which the calculation unit 1006 refers in step S11221 and the thickness D of the metallic layer acquired in step S510. The calculation method is similar to the method used by the third generation unit 508 in the first embodiment, so that the description thereof is omitted. Further, as in the first embodiment, the probability distributions $p(\theta)$ and $p(\phi)$ of the zenith angle $\theta$ and the azimuth angle $\phi$ of the flake normal are calculated.

In step S11223, the calculation unit 1006 calculates the flake normal $n_f$ by randomly determining $\theta$ and $\phi$ based on the probability distributions $p(\theta)$ and $p(\phi)$ of the zenith angle $\theta$ and the azimuth angle $\phi$ calculated in step S11222. The calculation method is similar to the method used by the third generation unit 508 in the first embodiment, so that the description thereof is omitted.

In step S11224, the calculation unit 1006 determines a position in the normal data at which the flake is to be placed. The calculation unit 1006 randomly selects a position $(x, y, z)$ at which the flake is to be placed, from positions $(x, y, z)$ in the normal data.

In step S11225, the calculation unit 1006 generates the brilliance reflection data $R_f(x, y, z)$ representing a table in which the flake arrangement position $(x, y, z)$ selected in step S11224 is associated with the flake normal $n_f$ and the flake size S. The brilliance reflection data $R_f(x, y, z)$ can be expressed as formula (14), $$R_f(x,y,z)=\{(n_f,S)\} \quad (14).$$

In a case in which the brilliance reflection data $R_f(x, y, z)$ is previously generated, the correspondence relationship between $(x, y, z)$, $n_f$, and S is added to the table represented by the brilliance reflection data $R_f(x, y, z)$.

In step S11226, the calculation unit 1006 judges whether the number of correspondence relationships held in the table with respect to the referenced flake size S reaches the frequency of the referenced flake size S. If the number of correspondence relationships is greater than or equal to the frequency of the referenced flake size S(YES in step S11226), the processing returns to step S11221, and steps S11222 to S11226 are executed by referring to a different flake size S. On the other hand, if the number of correspondence relationships is less than the frequency of the referenced flake size S (NO in step S11226), steps S11223 to S11226 are executed again, and the correspondence relationship between $(x, y, z)$, $n_f$, and S is added to the table represented by the brilliance reflection data $R_f(x, y, z)$.

<Output Image Data Generation Processing>

Figure 14:
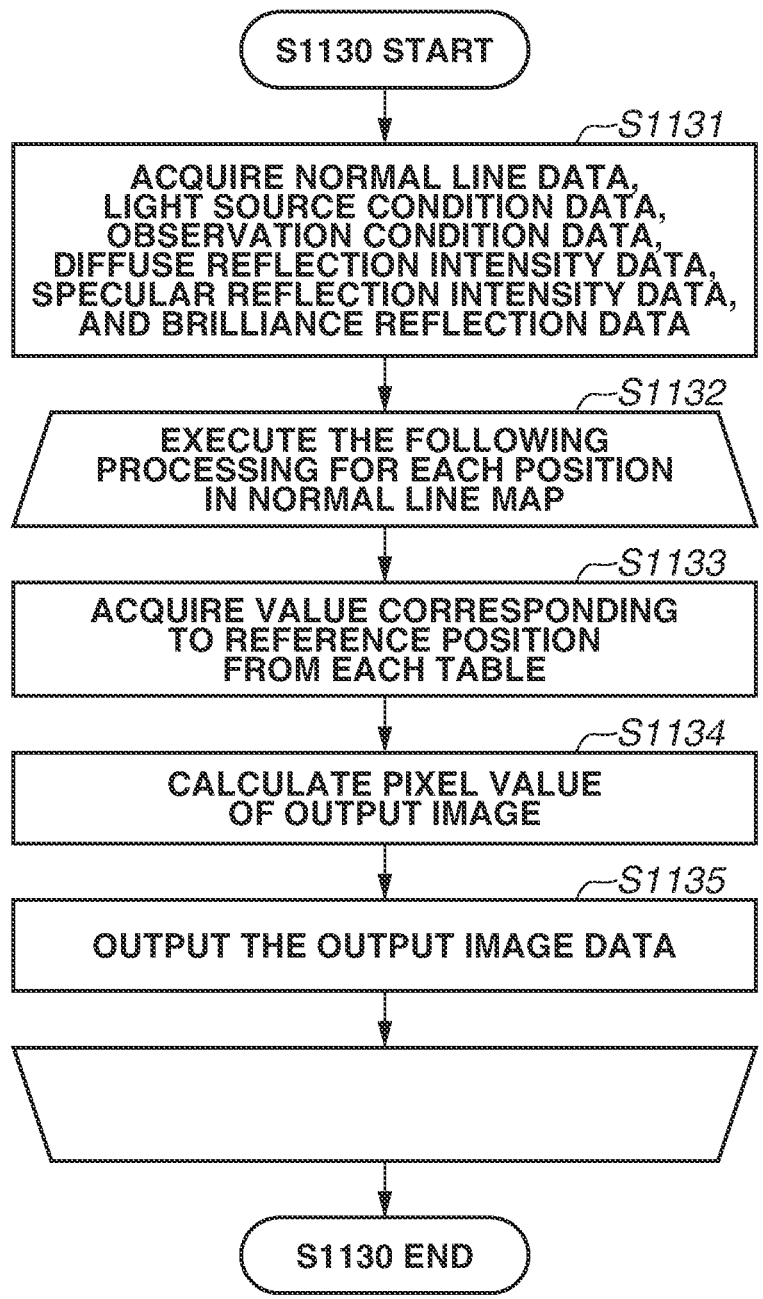
FIG. 14 is a flowchart illustrating a process of generating output image data.

In step S1130, the output image generation unit 1007 generates the output image data based on the normal map $n(x, y, z)$, the light source vector l, the light source intensity E, and the observation vector v acquired in step S510 and the reflection characteristics calculated in step S1120. The reflection characteristics calculated in step S1120 are the diffuse reflection intensity data $R_d(x, y, z)$, the specular reflection intensity data $R_s(x, y, z)$, and the brilliance reflection data $R_f(x, y, z)$. FIG. 14 is a flowchart illustrating a process that is executed by the output image generation unit 1007 in step S1130. The output image data generation processing is described below with reference to FIG. 14.

In step S1131, the output image generation unit 1007 acquires the normal map $n(x, y, z)$, the light source vector l, the light source intensity E, and the observation vector v acquired in step S510 and the reflection characteristics calculated in step S1120. The reflection characteristics are the diffuse reflection intensity data $R_d(x, y, z)$, the specular reflection intensity data $R_s(x, y, z)$, and the brilliance reflection data $R_f(x, y, z)$.

In step S1132, the output image generation unit 1007 refers to the normal map $n(x, y, z)$ and executes steps S1133 to S1135 for each position $(x, y, z)$ in the normal map $n(x, y, z)$.

In step S1133, the output image generation unit 1007 acquires values corresponding to the referenced position, from the tables represented respectively by the diffuse reflection intensity data $R_d(x, y, z)$, the specular reflection intensity data $R_s(x, y, z)$, and the brilliance reflection data $R_f(x, y, z)$. In the present embodiment, a value $R_d$ is acquired from the diffuse reflection intensity data $R_d(x, y, z)$, a value $R_s$ is acquired from the specular reflection intensity data $R_s(x, y, z)$, and values $n_f$ and S are acquired from the brilliance reflection data $R_f(x, y, z)$.

In step S1134, the output image generation unit 1007 calculates a pixel value of the output image using formulas (15), (16), and (17) shown below. Specifically, a diffuse reflection component $I_d(u, v)$ and a specular reflection component $I_s(u, v)$ of reflection light and a brilliance reflection component $I_f(u, v)$ for expressing sense of sparkle are respectively calculated, and the sum of the calculated values is determined as the pixel value of the output image. The diffuse reflection component $I_d(u, v)$ is calculated using formula (15) based on the Lambert's cosine law, as in the first embodiment, $$I_d(u,v)=E\, R_d(x,y,z)\times\text{dot}(n(x,y,z),l) \quad (15).$$

The specular reflection component $I_s(u, v)$ is calculated using formula (16) based on the Blinn-Phong model, as in the first embodiment, $$I_s(u,v)=E\times R_s(x,y,z)\times\text{dot}(n(x,y,z),h)^n \quad (16).$$

The brilliance reflection component $I_s(u, v)$ is calculated using formula (17), as in the first embodiment, $$I_f(u,v)=E\times\Sigma_{x',y',z'}A((u,v),R_f(x,y,z)n_f,R_f(x',y',z')_s)\times\delta(|R_f(x,y,z)_{n_f}-h|) \quad (17).$$

In formula (17), $R_f(x, y, z)_{n_f}$ denotes the normal $n_f$ of the flake that is held in the table represented by the brilliance reflection data $R_f(x, y, z)$, and $R_f(x, y, z)$ denotes the flake size that is held in the table represented by the brilliance reflection data $R_f(x, y, z)$. $A((u, v), R_f(x', y', z')_{n_f}, R_f(x', y', z')_s)$ is a function that returns zero in a case in which the flake of the size S that is placed at the gradient of the normal $n_f$ with the position (x', y', z') being the center is not observed at the position (u, v) on the image. On the other hand, in a case in which the flake is observed at the position (u, v) on the image, $A((u, v), R_f(x', y', z')_{n_f}, R_f(x', y', z')_s)$ returns the proportion t of the flake with respect to the pixel size of the position (u, v) on the image.

The diffuse reflection component $I_d(u, v)$, the specular reflection component $I_s(u, v)$, and the brilliance reflection component $I_f(u, v)$ calculated as described above are added to calculate the pixel value of the output image. Further, the output image generation unit 1007 generates the output image data representing the output image and outputs the generated output image data to the display 15.

Benefit of Second Embodiment

As described above, the image processing apparatus according to the present embodiment calculates the reflection characteristics of the object and then performs rendering for expressing sense of sparkle based on the calculated reflection characteristics and the input geometric condition. In this way, in a case of generating an image while the geometric condition such as an observation condition is changed, rendering can be performed using the reflection characteristics calculated in advance without the need to perform all the processing. In other words, in a case in which only the geometric condition including the observation condition and the light source condition is to be changed, the reflection characteristic calculation processing in step S1120 does not need to be performed. This reduces the calculation costs for determining the flake orientation and arrangement.

In the first embodiment, an example is described in which the image for expressing sense of sparkle is generated based on the thickness of the metallic layer and the flake size frequency distribution that are input as the sparkle data. In a third embodiment, the thickness of the metallic layer and the flake size frequency distribution that are associated with a number specifying a coating material designated by the user are acquired. Further, an image for expressing sense of sparkle is generated based on the acquired thickness of the metallic layer and the flake size frequency distribution. A hardware configuration of the image processing apparatus 1 according to the present embodiment is similar to that according to the first embodiment, so that the description thereof is omitted. A difference between the present embodiment and the first embodiment will be mainly described here.

<Logical Configuration of Image Processing Apparatus 1>

Figure 15:
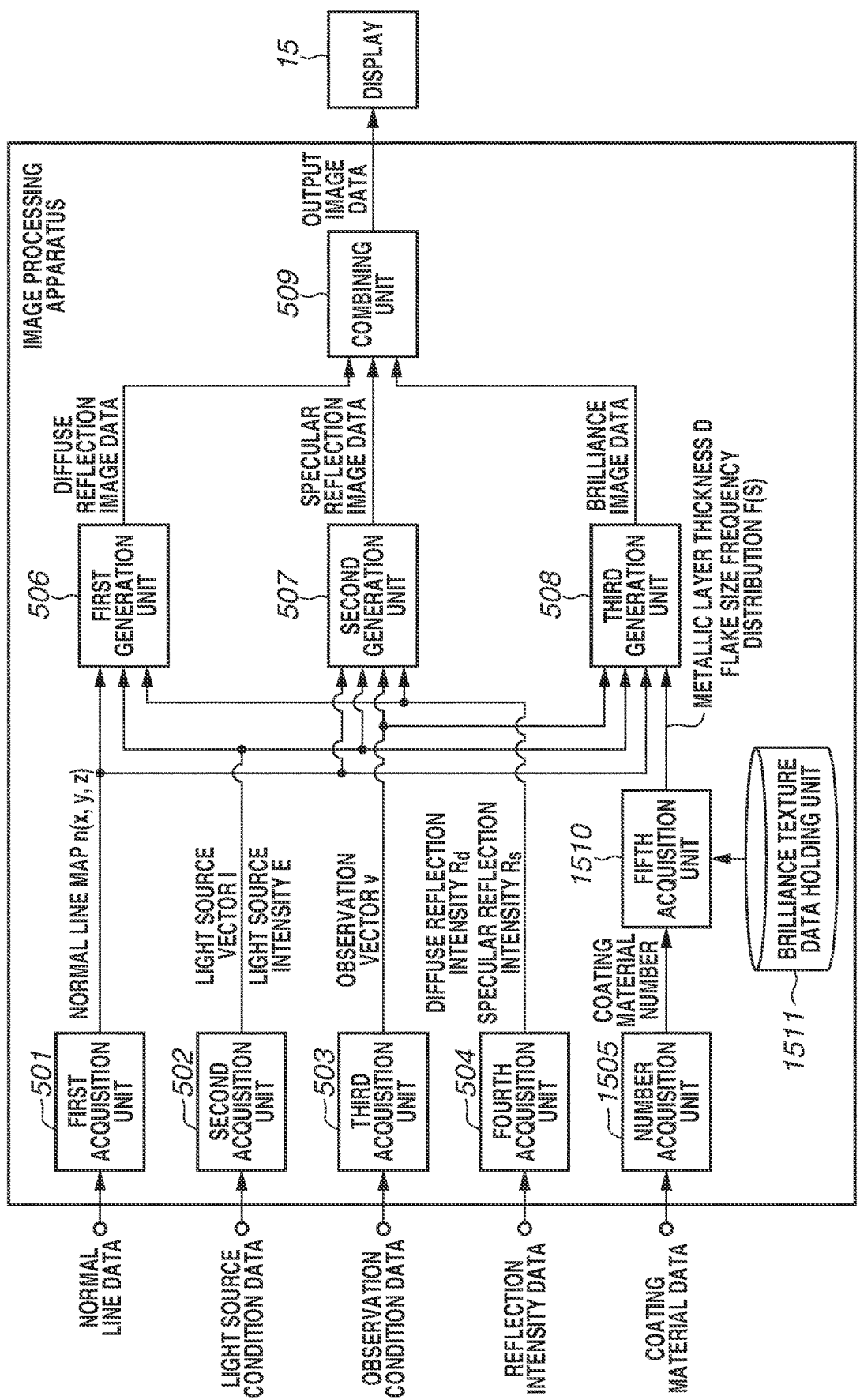
FIG. 15 is a block diagram illustrating a logical configuration of the image processing apparatus.

A process executed by the image processing apparatus 1 according to the present embodiment is described with reference to FIG. 15. FIG. 15 is a block diagram illustrating a logical configuration of the image processing apparatus 1. The CPU 101 executes a computer program read into the RAM 103 from the ROM 102, and the like to implement the processing of each unit described below as software. Not all the processing described below needs to be executed by the CPU 101, and the image processing apparatus 1 may be configured in such a manner that a processing circuit or a plurality of processing circuits other than the CPU 101 performs part of or entire processing.

The image processing apparatus 1 includes the first to fourth acquisition units 501 to 504, a number acquisition unit 1505, a fifth acquisition unit 1510, a sparkle data holding unit 1511, the first to third generation units 506 to 508, and the combining unit 509. The first to fourth acquisition units 501 to 504, the first to third generation units 506 to 508, and the combining unit 509 are similar to those described in the first embodiment, so that the description thereof is omitted. The number acquisition unit 1505 acquires coating material data for identifying a coating material for use in coating. The fifth acquisition unit 1510 acquires, from the sparkle data holding unit 1511, the thickness of the metallic layer and the flake size frequency distribution that are associated with the coating material number specified by the coating material data. The sparkle data holding unit 1511 holds the thickness of the metallic layer and the flake size frequency distribution that are associated with the coating material number specified by the coating material data.

<Process Executed by Image Processing Apparatus 1>

Figure 16:
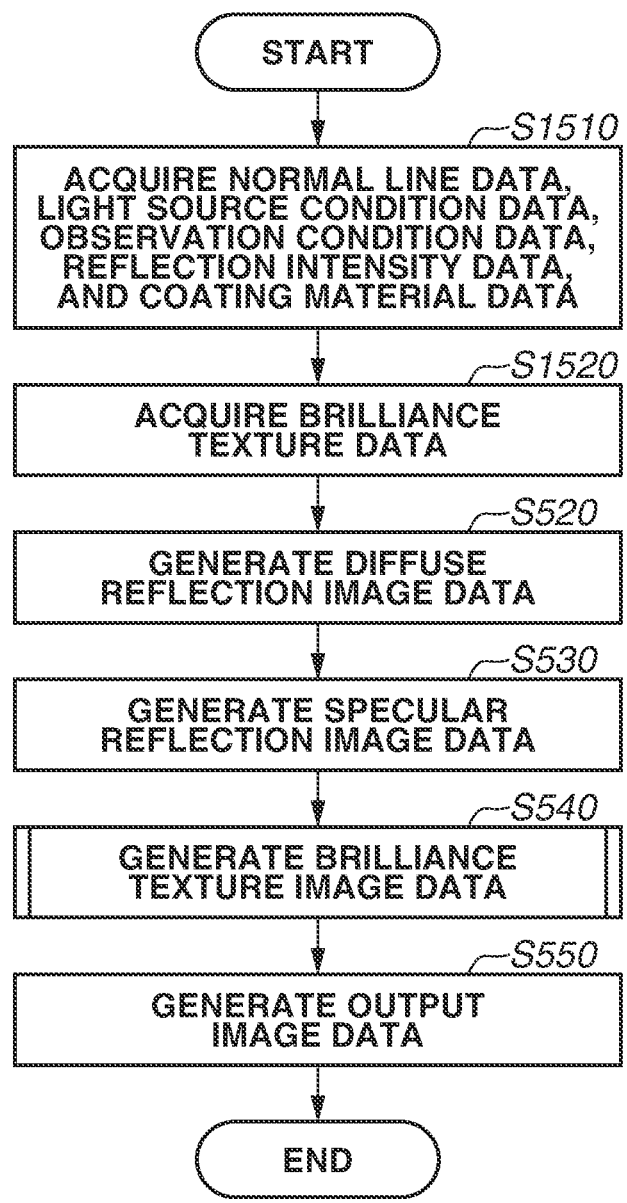
FIG. 16 is a flowchart illustrating a process executed by the image processing apparatus.

FIG. 16 is a flowchart illustrating a process executed by the image processing apparatus 1. Details of the process executed by the image processing apparatus 1 is described with reference to FIG. 16. The process described below is started when a user instruction via the input device 13 is received In step S1510, the first to fourth acquisition units 501 to 504 and the number acquisition unit 1505 each acquire data based on a user instruction. The first to fourth acquisition units 501 to 504 each perform processing similar to that in step S510 in the first embodiment, so that the description thereof is omitted. The number acquisition unit 1505 acquires the coating material data specifying the identification number of the coating material. The UI in the present embodiment is displayed as illustrated in FIG. 17, and the coating material data is acquired based on the number input via the UI illustrated in FIG. 17.

In step S1520, the fifth acquisition unit 1510 acquires, from the sparkle data holding unit 1511, the thickness of the metallic layer and the flake size frequency distribution that are associated with the coating material data acquired in step S1510. The sparkle data holding unit 1511 is the database illustrated in FIG. 18 and holds the thickness of the metallic layer and the flake size frequency distribution that correspond to the coating material data in a form of a table.

Processing performed in steps S520, S530, S540, and S550 are similar to that performed in the first embodiment, so that the description thereof is omitted.

Benefit of Third Embodiment

As described above, the image processing apparatus in the present embodiment acquires the coating material information and generates the image data representing the image containing the luminous points based on the acquired information. In this way, the image for expressing sense of sparkle is generated without the need for inputting the thickness of the metallic layer and the flake size frequency distribution.

In the first embodiment, the image expressing sense of sparkle is generated based on the thickness of the metallic layer and the flake size frequency distribution that are designated by the user. In a fourth embodiment, only the flake size frequency distribution designated by the user is acquired, and images expressing sense of sparkle in the plural kinds of thicknesses of layers is generated and displayed. The hardware configuration of the image processing apparatus 1 in the present embodiment is similar to that in the first embodiment, so that the description thereof is omitted. A difference between the present embodiment and the first embodiment is mainly described here.

<Logical Configuration of Image Processing Apparatus 1>

Figure 19:
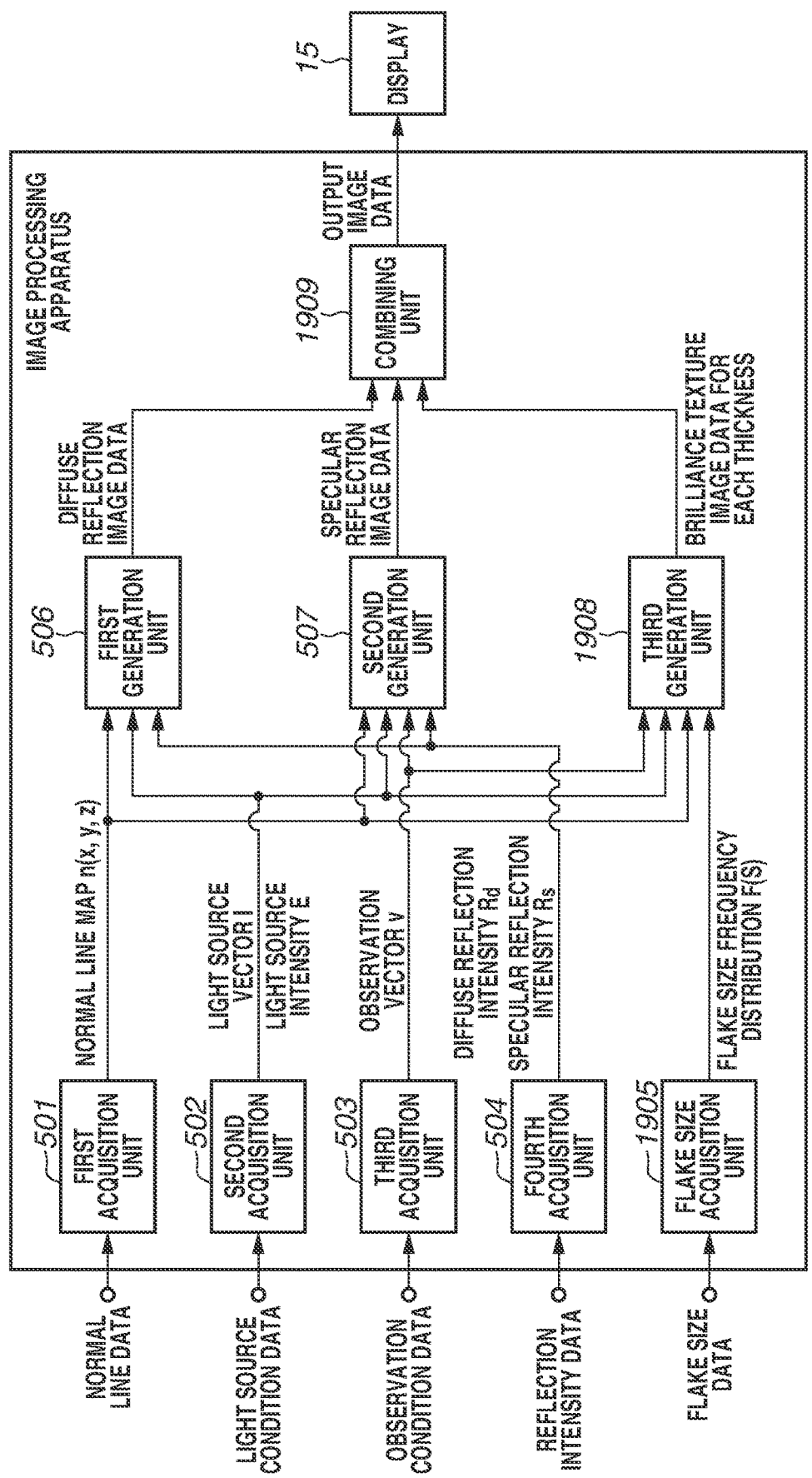
FIG. 19 is a block diagram illustrating a logical configuration of the image processing apparatus.

A process that is executed by the image processing apparatus 1 in the present embodiment is described with reference to FIG. 19. FIG. 19 is a block diagram illustrating a logical configuration of the image processing apparatus 1. The CPU 101 executes a computer program read into the RAM 103 from the ROM 102 or the like to implement the processing of each unit described below as software. Not all the processing described below needs to be executed by the CPU 101, and the image processing apparatus 1 may be configured in such a manner that a processing circuit or a plurality of processing circuits other than the CPU 101 performs part of or entire processing.

The image processing apparatus 1 includes the first to fourth acquisition units 501 to 504, a flake size acquisition unit 1905, the first and second generation units 506 and 507, a third generation unit 1908, and a combining unit 1909. The first to fourth acquisition units 501 to 504 and the first and second generation units 506 and 507 are similar to those described in the first embodiment, so that the description thereof is omitted. The flake size acquisition unit 1905 acquires flake size data representing the flake size frequency distribution. The third generation unit 1908 generates the sparkle image data for expressing sense of sparkle in the thicknesses of a plurality of metallic layers based on the normal data, the light source condition data, the observation condition data, and the flake size data. The combining unit 1909 calculates the sum of the diffuse reflection component and the specular reflection component of reflection light and the sparkle component for expressing sense of sparkle based on the diffuse reflection image data, the specular reflection image data, and the sparkle image data for each thickness. More specifically, pixel values of the respective pieces of image data are added to calculate pixel values of the output image for each thickness. Further, the pixel values may be weighted and then added in order to further emphasize the sense of sparkle.

<Process Executed by Image Processing Apparatus 1>

Figure 20:
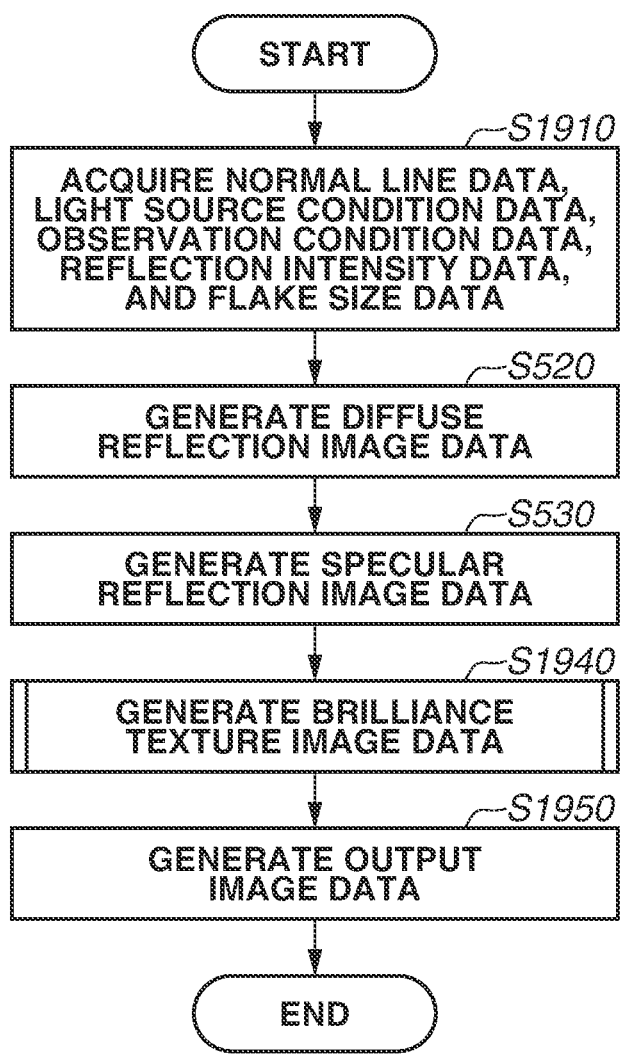
FIG. 20 is a flowchart illustrating a process executed by the image processing apparatus.

FIG. 20 is a flowchart illustrating a process executed by the image processing apparatus 1. Details of the process executed by the image processing apparatus 1 is described with reference to FIG. 20. The process described below is started when a user instruction via the input device 13 is received In step S1910, the first to fourth acquisition units 501 to 504 and the flake size acquisition unit 1905 acquire data based on a user instruction. The first to fourth acquisition units 501 to 504 each perform processing similar to that performed in step S510 in the first embodiment, so that the description thereof is omitted. The flake size acquisition unit 1905 acquires the flake size data. The flake size data specifies the flake size frequency distribution and is acquired via the UI illustrated in FIG. 21.

The processing performed in steps S520 and S530 is similar to those performed in the first embodiment, so that the description thereof is omitted.

In step S1940, the third generation unit 1908 generates the sparkle image data for each thickness of the metallic layer based on the normal map n(x, y, z), the light source vector l, the light source intensity E, the observation vector v, and the flake size frequency distribution F(S) that are acquired in step S1910. A pixel value of a sparkle image $I_{f,D}$ represented by the sparkle image data for the thickness D of the metallic layer is denoted by $I_{f,D}(u, v)$. Details of the processing of generating the sparkle image data for each thickness of the plurality of the metallic layers will be described below.

In step S1950, the combining unit 1909 calculates the sum of $I_d(u, v)$, $I_s(u, v)$, and $I_{f,D}(u, v)$ for each pixel and generates the output image data representing an output image $I_{out,D}$ in which the calculated sum $I_{out,D}(u, v)$ is recorded in each pixel. Further, the combining unit 1909 outputs the generated output image data to the display 15. Details of the output image data generation processing will be described below.

<Processing of Generating Sparkle Image Data for Each Thickness of a Plurality of Metallic Layers>

Figure 22:
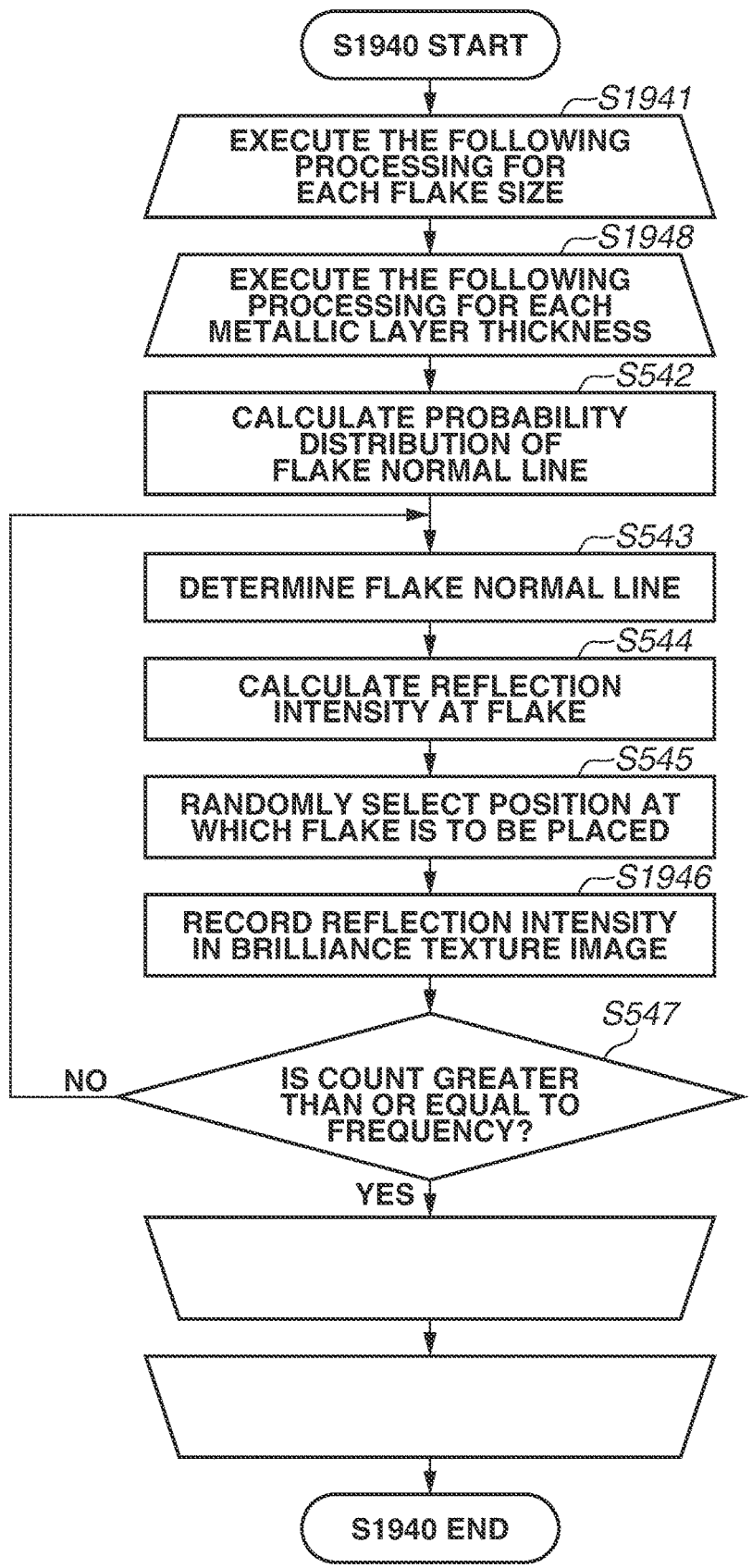
FIG. 22 is a flowchart illustrating a process of generating sparkle image data.

In step S1940, the third generation unit 1908 calculates the pixel value $I_{f,D}(u, v)$ for the thickness D of the metallic layer based on the normal map, the light source vector, the light source intensity, the observation vector, and the flake size frequency distribution that are acquired in step S1910. More specifically, while the thickness D of the metallic layer is gradually changed, the position and orientation of each flake contained in the metallic layer are randomly determined in a state in which the flake orientation is physically restricted by each thickness D. Based on the determined position and orientation of each flake, the sparkle image data is generated. FIG. 22 is a flowchart illustrating a process executed by the third generation unit 1908 in step S1940. Details of the sparkle image data generation processing is described with reference to FIG. 22.

In step S1941, the third generation unit 1908 refers to the flake size frequency distribution F(S) acquired in step S1910 and executes steps S1948, S542 to S545, S1946, and S547 for each flake size S.

In step S1948, the third generation unit 1908 executes steps S542 to S545, S1946, and S547 for each thickness D of the metallic layer. The thickness D of the metallic layer is a preset value and is set to, for example, 10 μm, 20 μm, and 30 μm.

In step S1946, the third generation unit 1908 records the reflection intensity $i_f$ calculated in step S544 in the sparkle image $I_{f,D}$.

<Output Image Data Generation Processing>

In step S1950, the combining unit 1909 calculates the sum $I_{out,D}(u, V)$ for each pixel value of the diffuse reflection image $I_d$, the specular reflection image $I_s$, and the sparkle image $I_{f,D}$ for each thickness D of the metallic layer. The combining unit 1909 generates the output image data representing the output image $I_{out,D}$ for each thickness D of the metallic layer based on the sum $I_{out,D}(u, v)$. In the present embodiment, in order to calculate the pixel value for each of R, G, and B, the pixel values of the sparkle image $I_{f,D}$ for each thickness D of the metallic layer are calculated based on the assumption that the pixel values of the respective R, G, and B channels are equal.

Figure 23:
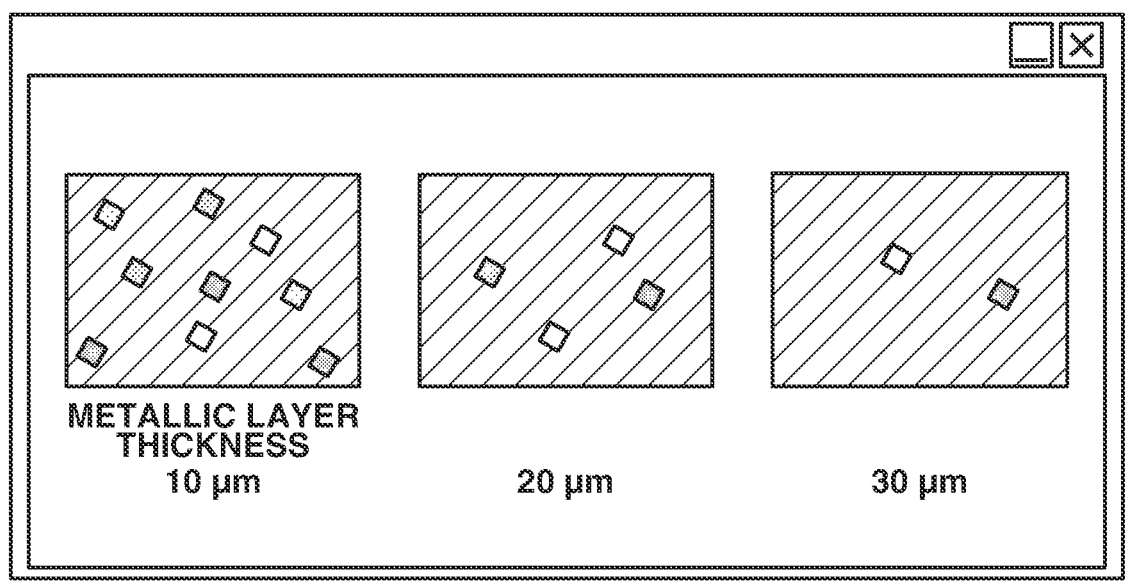
FIG. 23 illustrates an example of an output image displayed on a display.

Further, the generated output image data for each thickness D of the metallic layer is output to the display 15 to display the output image on the display 15. The output image is displayed together with the thickness D of the metallic layer as illustrated in FIG. 23.

Benefit of Fourth Embodiment

As described above, the image processing apparatus according to the present embodiment uses only the flake size frequency distribution as the input, from the two pieces of sparkle data i.e., the thickness of the metallic layer and the flake size frequency distribution. In this way, the images with respect to various layer thicknesses with the flake size fixed can be checked simultaneously to make it possible to select a layer thickness that expresses desired/predetermined sense of sparkle. Thus, the coating parameter settings are settable by virtually checking appearances in the cases of different thicknesses of the metallic layer.

In the first embodiment, the image is generated based on the light source vector and the light source intensity input as the light source condition data. In a fifth embodiment, information about a surrounding environment for simulating the appearance of the object is used as the light source condition data. The hardware configuration of the image processing apparatus 1 in the present embodiment is similar to that in the first embodiment, so that the description thereof is omitted. A difference between the present embodiment and the first embodiment is mainly described below.

<Logical Configuration of Image Processing Apparatus 1>

Figure 24:
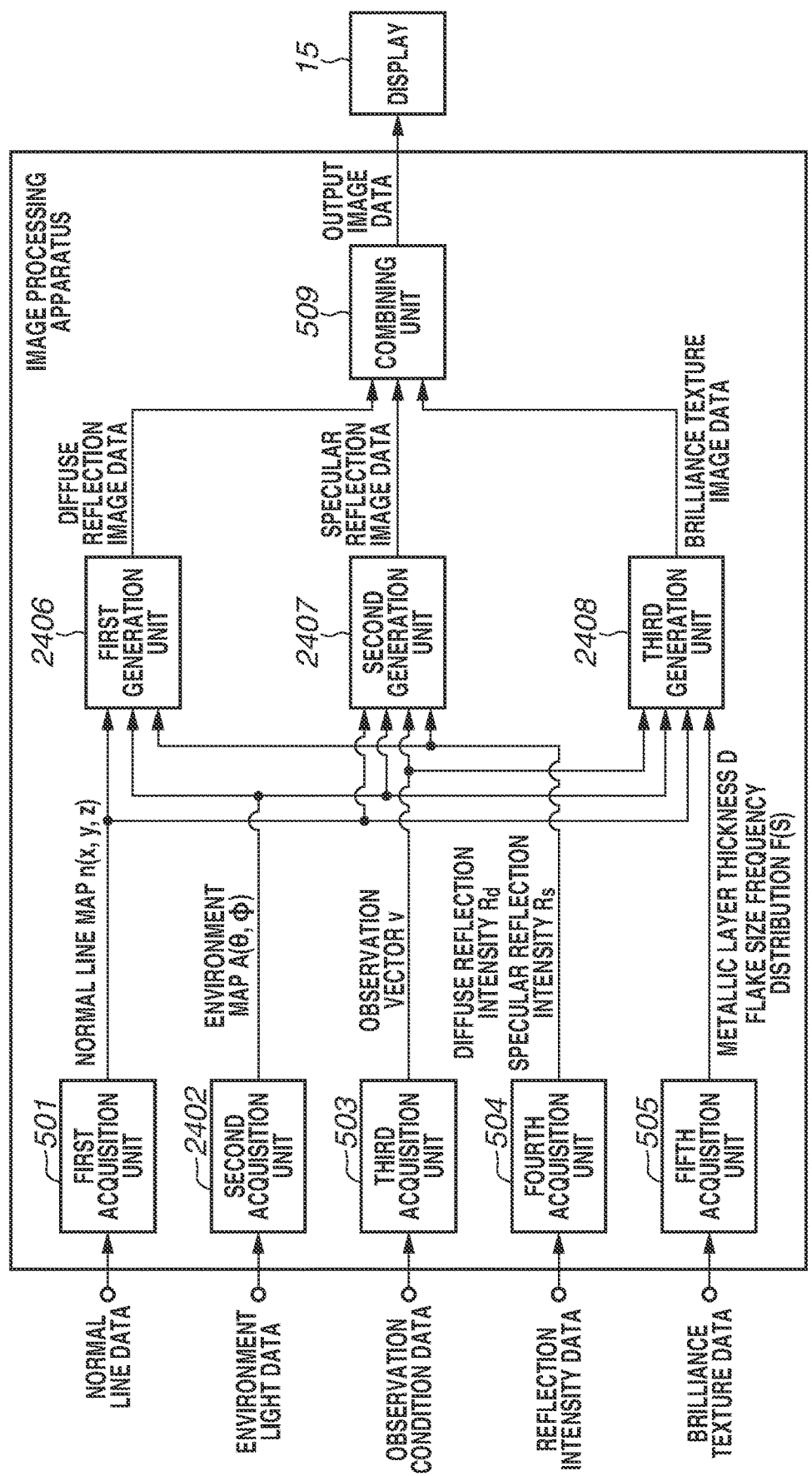
FIG. 24 is a block diagram illustrating a logical configuration of the image processing apparatus.

A process executed by the image processing apparatus 1 in the present embodiment is described below with reference to FIG. 24. FIG. 24 is a block diagram illustrating a logical configuration of the image processing apparatus 1. The CPU 101 executes a computer program read into the RAM 103 from the ROM 102 or the like to implement the processing of each unit described below as software. Not all the processing described below needs to be executed by the CPU 101, and the image processing apparatus 1 can be configured such that a processing circuit or a plurality of processing circuits other than the CPU 101 performs part of or entire processing.

The image processing apparatus 1 includes the first acquisition unit 501, a second acquisition unit 2402, the third to fifth acquisition units 503 to 505, first to third generation units 2406 to 2408, and the combining unit 509. The first acquisition unit 501, the third to fifth acquisition units 503 to 505, and the combining unit 509 are similar to those in the first embodiment, so that the description thereof is omitted. The second acquisition unit 2402 acquires environment light data representing an illumination distribution in the surrounding environment for expressing the appearance of the object. The first generation unit 2406 generates the diffuse reflection image data representing the intensity of diffuse reflection light acquired under a user-set geometric condition, based on the normal data, the environment light data, and the reflection intensity data. The second generation unit 2407 generates the specular reflection image data representing the intensity of specular reflection light acquired under the user-set geometric condition, based on the normal data, the environment light data, the observation condition data, and the reflection intensity data. The third generation unit 2408 generates the sense of sparkle image data for expressing sense of sparkle based on the normal data, the environment light data, the observation condition data, and the sense of sparkle data.

<Process Executed by Image Processing Apparatus 1>

FIG. 25 is a flowchart illustrating a process executed by the image processing apparatus 1. Details of the process executed by the image processing apparatus 1 is described with reference to FIG. 25. The process described below is started when a user instruction via the input device 13 is received In step S2410, the first acquisition unit 501, the second acquisition unit 2402, and the third to fifth acquisition units 503 to 505 acquire data based on a user instruction. The first acquisition unit 501 and the third to fifth acquisition units 503 to 505 each perform processing similar to that performed in step S510 in the first embodiment, so that the description thereof is omitted. The second acquisition unit 2402 acquires the environment light data. The environment light data is an environment map $A(\theta, \phi)$ representing the illumination intensity in the directions of the zenith angle $\theta$ and the azimuth angle $\phi$ of the spherical coordinate system with the object being the center. The environment map $A(\theta, \phi)$ is an image acquired via the UI illustrated in FIG. 26A, and each pixel holds the illumination intensity in the directions of the azimuth angle $\phi$ and the zenith angle $\theta$. As illustrated in FIG. 26B, the x-axis direction of the image corresponds to the azimuth angle $\phi$ and the y-axis direction of the image corresponds to the zenith angle $\theta$.

In step S2420, the first generation unit 2406 generates the diffuse reflection image data representing the diffuse reflection image $I_d$ based on the normal map n(x, y, z), the environment map $A(\theta, \phi)$, and the diffuse reflection intensity $R_d$ that are acquired in step S2410. The pixel value of the diffuse reflection image $I_d$ is denoted by $I_d(u, v)$. As used herein, (u, v) represents the pixel position on the image that corresponds to the position (x, y, z). Details of the diffuse reflection image data generation processing will be described below.

In step S2430, the second generation unit 2407 generates the specular reflection image data representing the specular reflection image $I_s$ based on the normal map n(x, y, z), the environment map $A(\theta, \phi)$, the observation vector v, and the specular reflection intensity $R_s$ that are acquired in step S2410. The pixel value of the specular reflection image $I_s$ is denoted by $I_s(u, v)$. Details of the specular reflection image data generation processing will be described below.

In step S2440, the third generation unit 2408 generates the sparkle image data based on the normal map n(x, y, z), the environment map $A(\theta, \phi)$, the observation vector v, the thickness D of the metallic layer, and the flake size frequency distribution F(S) that are acquired in step S2410. The pixel value of the sparkle image $I_f$ represented by the sparkle image data is denoted by $I_f(u, v)$. Details of the sparkle image data generation processing will be described below.

Processing performed in step S550 is similar to that performed in the first embodiment, so that the description thereof is omitted.

<Diffuse Reflection Image Data Generation Processing>

In step S2420, the first generation unit 2406 calculates each pixel value $I_d(u, v)$ of the diffuse reflection image $I_d$ based on the normal map n(x, y, z), the environment map $A(\theta, \phi)$, and the diffuse reflection intensity $R_d$ that are acquired in step S2410. More specifically, $I_d(u, v)$ is calculated using formula (18) based on the Lambert's cosine law with respect to the light source vector $I_{\theta,\phi} = (\sin\theta\cos\phi, \sin\theta\sin\phi, \cos\theta)$ in the environment map $A(\theta, \phi)$.

$$I_d(u,v) = \Sigma_{\theta,\phi} A(\theta,\phi) \times R_d \times \text{dot}(n(x,y,z), l_{\theta,\phi}) \quad (18),$$

where dot(n(x, y, z), $l_{\theta,\varphi}$) represents the inner product operation of the normal map n(x, y, z) and the light source vector $l_{\theta,\varphi}$ and is replaced by zero if the inner product is negative.

<Specular Reflection Image Data Generation Processing>

In step S2430, the second generation unit 2407 calculates each pixel value $I_s(u, v)$ of the specular reflection image $I_s$ based on the normal map n(x, y, z), the environment map $A(\theta, \varphi)$, the observation vector v, and the specular reflection intensity $R_s$ that are acquired in step S2410. More specifically, $I_s(u, v)$ is calculated using formula (19) based on the Blinn-Phong model with respect to the light source vector $l_{\theta,\varphi}$=(sin θ cos φ, sin θ sin φ, cos θ) in the environment map $A(\theta, \varphi)$.

$$I_s(u,v)=\Sigma_{\theta,\varphi}A(\theta,\phi)\times R_s \times \text{dot}(n(x,y,z),h_{\theta,\varphi})^n \quad (19)$$

In formula (19), $h_{\theta,\varphi}$ is the half vector of the light source vector $l_{\theta,\varphi}$ and the observation vector v and is calculated by $h_{\theta,\varphi}=(l_{\theta,\varphi}+v)/|l_{\theta,\varphi}+v|$. The constant n is a value that represents the degree of spread of specular reflection, and the greater the value becomes, the smaller the spread of the specular reflection becomes. As the constant n, a value based on a user instruction via the UI illustrated in FIG. 26 may be used, or a predetermined value may be used.

<Sparkle Image Data Generation Processing>

In step S2440, the third generation unit 2408 calculates the pixel value $I_f(u, v)$ based on the normal map n(x, y, z), the environment map $A(\theta, \varphi)$, the observation vector v, the thickness D of the metallic layer, and the flake size frequency distribution F(S) that are acquired in step S2410. FIG. 27 is a flowchart illustrating a process executed by the third generation unit 2408 in step S2440. Details of the sparkle image data generation processing is described below with reference to FIG. 27.

The processing performed in steps S541 to S543 are similar to those performed in the first embodiment, so that the description thereof is omitted.

In step S2444, the third generation unit 2408 calculates the intensity (reflection intensity) of light reflected on the flake based on the flake normal $n_f$ calculated in step S543. On the flakes, specular reflection occurs like on a metal, so that the spread of reflection light is not taken into consideration and the reflection intensity $i_f$ is calculated based on the model expressed by formula (20), $$i_f=\Sigma_{\theta,\varphi}A_{interp}(\theta,\phi)\times\delta(|n_f-h_{\theta,\varphi}|) \quad (20)$$

In formula (20), δ(x) is a delta function and has a value as specified by formula (10). Further, $A_{interp}(\theta, \varphi)$ is a value that is obtained by interpolating the zenith angle θ and the azimuth angle φ of the light source vector $l_{\theta,\varphi}$ corresponding to $h_{\theta,\varphi}$ into the environment map $A(\theta', \varphi')$ having discrete values.

According to the model expressed by formula (20), the reflection intensity $i_f$ has a value in a case where the light source vector and the observation vector satisfy the geometric condition of specular reflection, whereas the reflection intensity $i_f$ is zero in other cases.

The processing performed in steps S545 to S547 are similar to those performed in the first embodiment, so that the description thereof is omitted.

Benefit of Fifth Embodiment

As described above, the image processing apparatus in the present embodiment generates the image for expressing sense of sparkle based on the environment map representing the illumination distribution in the surrounding environment for simulating the appearance of the object. This makes it possible to simulate sense of sparkle in an environment in which illuminations from various directions exist.

Modified Example

While the example of the processing for virtually expressing the sense of sparkle that occurs due to the layer containing the flakes of different sizes is described in the above-described embodiments, the processing is not limited to the above-described example. In a case in which the plurality of flakes contained in the layer has substantially the same size, the amount (number and density) of flakes and the flake size may be acquired and used in the processing in place of the flake size frequency distribution. In this case, the processing does not need to be performed for each flake size, and the processing in steps S543 to S546 in the first embodiment or the processing in steps S11223 to S11226 in the second embodiment are to be performed number of times corresponding to the amount of flakes. Further, the processing in steps S543 to S545 and S1946 in the fourth embodiment or the processing in steps S543, S2444, S545, and S546 in the fifth embodiment are to be performed the number of times corresponding to the amount of flakes.

While the object including the metallic layer containing a plurality of metal flakes such as aluminum flakes is considered in the above-described embodiments, the flakes to be contained in the surface layer of the object to generate sense of sparkle are not limited to the metal flakes. For example, a layer containing a plurality of mica flakes also produces sense of sparkle. The same applies to a layer that contains both a metal flake and a mica flake.

While the reflection on the coating material layer including the three layers of the color forming layer, the clear layer, and the metallic layer is expressed in the above-described embodiments, the coating material layer is not limited to the above-described three-layer coating material layer and can be any coating material layer including a layer containing a flake for expressing sense of sparkle. For example, the coating material layer may include only the metallic layer or may include two layers of the clear layer and the metallic layer.

While the example in which the diffuse reflection and specular reflection on the object surface and the specular reflection on the flake that generates sense of sparkle are virtually expressed is described in the above-described embodiments, only the specular reflection on the flake that generates sense of sparkle may virtually be expressed. In this case, the image processing apparatus 1 according to first embodiment may be configured not to include the fourth acquisition unit 504, the first generation unit 506, the second generation unit 507, and the combining unit 509. In this case, the image processing apparatus 1 performs only processing in steps S510 and S540 and outputs the sparkle image data generated in step S540 as the output image data. Further, the image processing apparatus 1 according to second embodiment may be configured not to include the fourth acquisition unit 504. In this case, the image processing apparatus 1 does not generate the diffuse reflection intensity data and the specular reflection intensity data and generates the brilliance reflection data in step S1120. Further, the image processing apparatus 1 according to third embodiment may be configured not to include the fourth acquisition unit 504, the first generation unit 506, the second generation unit 507, and the combining unit 509. In this case, the image processing apparatus 1 performs processing only in steps S1510, S1520, and S540 and outputs the sparkle image data generated in step S540 as the output image data. Further, the image processing apparatus 1 according to fourth embodiment may be configured not to include the fourth acquisition unit 504, the first generation unit 506, the second generation unit 507, and the combining unit 1909. In this case, the image processing apparatus 1 performs processing only in steps S1910 and S1940 and outputs the sparkle image data generated in step S1940 as the output image data. Further, the image processing apparatus 1 according to fifth embodiment may be configured not to include the fourth acquisition unit 504, the first generation unit 2406, the second generation unit 2407, and the combining unit 509. In this case, the image processing apparatus 1 performs processing only in steps S2410 and S2440 and outputs the sparkle image data generated in step S2440 as the output image data.

While the example in which the data for virtually expressing the diffuse reflection and specular reflection on the object surface and the specular reflection on the flake that produces sense of sparkle is generated, is described in the above-described embodiments, the data generation method is not limited to the above-described example. For example, the data on the diffuse reflection and specular reflection on the object surface may be generated in advance and recorded in a storage device such as the HDD 17 and then acquired from the storage device and used. More specifically, in the first embodiment, the diffuse reflection image data and the specular reflection image data may be generated in advance by performing processing similar to that in steps S520 and S530 and stored in the HDD 17, and the diffuse reflection image data and the specular reflection image data may be acquired in step S550 and used. Similarly, in the second embodiment, the processing in step S1121 can be performed in advance. In the third embodiment, the processing in steps S520 and S530 can be performed in advance. In the fourth embodiment, the processing in steps S520 and S530 can be performed in advance. In the fifth embodiment, the processing in steps S2420 and S2430 can be performed in advance.

While the example in which the output image data is output to the display 15 is described in the above-described embodiments, the output image data may be output to a different external apparatus. For example, the output image data may be output to the HDD 17 or the printer 14. In a case of outputting the output image data to the printer 14, the reflection intensity (luminance) recorded in each pixel of the output image may be converted into data that represents the recording amount of a recording material such as ink or toner or the dot arrangement, and the converted data may be output.

While the object shape is acquired using a method of imaging the object to which specific pattern light is projected in advance or a method using a laser scanner, and the normal data is generated based on the object shape in the above-described embodiments, a shape generated by a different method may be used. For example, a shape generated by computer graphics (CG) software may be used, or a shape contained in commercially-available CG software may be used.

While the diffuse reflection intensity $R_d$ and the specular reflection intensity $R_s$ are acquired as the reflection intensity data as illustrated in FIG. 7 in the above-described embodiments, the diffuse reflection intensity $R_d$ and the specular reflection intensity $R_s$ can each be acquired as image data. In this case, the respective pieces of image data represent an image in which the diffuse reflection intensity is recorded in each pixel and an image in which the specular reflection intensity is recorded in each pixel. The image data may be color image data having pixel values for each of R, G, and B colors or may be grayscale image data that represents only brightness.

In the above-described embodiments, the pixel values of the output image are calculated for each of the R, G, and B channels. In cases in which the colors do not need to be taken into consideration, a luminance (brightness) Y can be calculated using formula (21) based on R, G, and B values input via the UI illustrated in FIG. 7 and used in the processing.

$$Y=0.2126 \times R+0.7152 \times G+0.0722 \times B \tag{21}$$

While the flakes contained in the metallic layer are disk-shaped in the above-described embodiments, the flake shape is not limited to the above-described example. For example, the flake shape may be a columnar or cubic shape. In this case, since the flake normal is affected by the layer thickness, the flake size is set to the maximum length in the three-dimensional flake shape. The flake size may include the flake thickness besides the flake length.

While the processing is performed based on the reflection intensity in the above-described embodiments, the processing may be performed based on a value such as reflectance, as long as the value represents the degree of reflection.

While the processing is performed in the order of step S520, step S530, and step S540 in the first embodiment, since the steps are independent of each other, the processing order is not limited to the above-described order. The processing order may be switched, or the steps may be executed simultaneously.

While the processing in step S1122 is executed after the processing in step S1121 in the second embodiment, since the steps are independent of each other, the processing order is not limited to the above-described order. The processing order may be switched, or the steps may be executed simultaneously.

While the processing is executed in the order of step S520, step S530, and step S540 in the third embodiment, since the steps are independent of each other, the processing order is not limited to the above-described order. The processing order may be switched, or the steps may be executed simultaneously.

While the processing is executed in the order of step S520, step S530, and step S1940 in the fourth embodiment, since the steps are independent of each other, the processing order is not limited to the above-described order. The processing order may be switched, or the steps may be executed simultaneously.

While the processing is executed in the order of step S2420, step S2430, and step S2440 in the fifth embodiment, since the steps are independent of each other, the processing order is not limited to the above-described order. The processing order may be switched, or the steps may be executed simultaneously.

While the coating data input UI via which a number is to be selected is described as an example in the third embodiment, the UI may be replaced by a UI that displays coating image samples and prompts the user to select a desired/predetermined coating from the displayed samples.

In the third to fifth embodiments, as in the first embodiment, the diffuse reflection image data, the specular reflection image data, and the sparkle image data are generated and then combined together to generate the output image data. This processing may be replaced by the processing of generating the spatially varying bidirectional reflectance distribution function (SVBRDF) as in the second embodiment.

While the flake size frequency distribution is input and images with respect to a plurality of different thicknesses of the metallic layer are generated in the fourth embodiment, the thickness of the metallic layer may be input to generate images with respect to a plurality of different flake size frequency distributions.

In the fifth embodiment, as in the first to third embodiments, the sparkle image data is generated based on the thickness of the metallic layer and the flake size. This processing may be replaced by the processing of generating the sparkle image data using the coating material number as the input, as in the third embodiment.

While the flake normal is calculated using the random number values within the range limited by the thickness of the metallic layer in the above-described embodiments, the flake normal acquisition method is not limited to the above-described example. For example, the flake normal may be acquired by referring to a table in which the limit range is associated with the flake normal.

According to the embodiments, sense of sparkle that is produced after an object is coated is virtually expressible even before the coating is performed.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Applications Nos. 2017-228334, filed Nov. 28, 2017, and 2018-148510, filed Aug. 7, 2018, which are hereby incorporated by reference herein in their entirety.

What is claimed is:

1. An image processing apparatus configured to generate image data representing an image for simulating appearance of an object coated with a coating material containing a plurality of flakes, the image processing apparatus comprising:
   an acquisition unit configured to acquire information about the coating material; and
   a generation unit configured generate based on the information about the coating material, the image data representing the image containing a texture of sparkle for expressing a reflection characteristic of the object according to reflections of light on the plurality of flakes.

2. The image processing apparatus according to claim 1, wherein, the generation unit generates the image data based on a thickness of a layer of the coating material, and sizes and an amount of the plurality of flakes.

3. The image processing apparatus according to claim 2, wherein the image data is data representing a correspondence relationship between a random arrangement of bright dots corresponding to the plurality of flakes in the image, information about an orientation of each flake of the plurality of flakes, and a size of each flake of the plurality of flakes.

4. The image processing apparatus according to claim 1, wherein the generation unit generates the image data based on a thickness of a layer of the coating material, and a frequency distribution of sizes of the plurality of flakes.

5. The image processing apparatus according to claim 2, further comprising a calculation unit is configured to calculate information about an orientation of each flake of the plurality of flakes based on the information about the coating material,
   wherein the generation unit generates the image data based on the information about the orientation of each flake.

6. The image processing apparatus according to claim 5, wherein the calculation unit is configured to determine a direction in which the plurality of flakes are allowed to be inclined based on the thickness of the layer of the coating material and the sizes of the plurality of flakes, and
   wherein, the calculation unit calculates the information about the orientation of each flake based on the direction in which the plurality of flakes are allowed to be inclined.

7. The image processing apparatus according to claim 5, wherein the calculation unit is configured to calculate a normal line with respect to a surface of each flake of the plurality of flakes as the information about the orientation of each flake.

8. The image processing apparatus according to claim 7, wherein the calculation unit is configured to determine a direction in which the normal line is allowed to be inclined based on the thickness of the layer of the coating material and the sizes of the plurality of flakes, and
   wherein, the calculation unit calculates the normal line based on the direction in which the normal line is allowed to be inclined.

9. The image processing apparatus according to claim 8, wherein the calculation unit is configured to determine directions in which the normal line is allowed to be inclined based on the thickness of the layer of the coating material and the sizes of the plurality of flakes, and
   wherein, the calculation unit randomly determines a direction of the normal line from the directions in which the normal line is allowed to be inclined.

10. The image processing apparatus according to claim 2, wherein the acquisition unit is a first acquisition unit, the image processing apparatus further comprising a second acquisition unit configured to acquire arrangement data representing a random arrangement of the bright dots respectively corresponding to the plurality of flakes in the image represented by the image data,
  wherein the generation unit generates the image data based further on the arrangement data.

11. The image processing apparatus according to claim 10, further comprising a third acquisition unit configured to acquire environment light data representing an illumination distribution in an environment surrounding the object, observation data representing a position of observation of the object, and normal line data representing a distribution of normal lines with respect to a surface of the object,
  wherein the generation unit generates the image data by calculating a reflection intensity to be recorded in a pixel of the image that corresponds to positions of the plurality of flakes based on the environment light data, the observation data, and the normal line data.

12. The image processing apparatus according to claim 10, further comprising a third acquisition unit configured to acquire light source data representing an intensity of light applied to the object by a light source and a position of the light source, observation data representing a position of observation of the object, and normal line data representing a distribution of normal lines with respect to a surface of the object,
  wherein the generation unit generates the image data by calculating a reflection intensity to be recorded in a pixel of the image that corresponds to positions of the plurality of flakes based on the light source data, the observation data, and the normal line data.

13. The image processing apparatus according to claim 12,
  wherein the third acquisition unit is configured to calculate a first vector representing a direction from the position of each flake of the plurality of flakes to the position of the light source based on the light source data, and to calculate a second vector representing a direction from the position of each flake of the plurality of flakes to the position of observation based on the observation data, and
  wherein the generation unit is configured to calculate the reflection intensity to be recorded in the pixel of the image that corresponds to the position of the plurality of flakes, based on the first vector, the second vector, and the intensity of the light.

14. The image processing apparatus according to claim 12, further comprising a fourth acquisition unit configured to acquire diffuse reflection intensity data representing a reflection intensity of diffuse reflection on the surface of the object,
  wherein the generation unit generates the image data based further on the diffuse reflection intensity data.

15. The image processing apparatus according to claim 14, wherein the generation unit is configured to generate the image data by adding the reflection intensity of diffuse reflection to the reflection intensity to be recorded in the pixel of the image.

16. The image processing apparatus according to claim 12, further comprising a fifth acquisition unit configured to acquire specular reflection intensity data representing a reflection intensity of specular reflection on the surface of the object,
  wherein the generation unit generates the image data based further on the specular reflection intensity data.

17. The image processing apparatus according to claim 16, wherein the generation unit is configured to generate the image data by adding the reflection intensity of specular reflection to the reflection intensity to be recorded in the pixel of the image.

18. The image processing apparatus according to claim 1, wherein the texture of sparkle is a texture containing bright dots corresponding to light reflections on the plurality of flakes.

19. A method for an image processing apparatus configured to generate image data representing an image for simulating appearance of an object coated with a coating material containing a plurality of flakes, the method comprising:
  acquiring information about the coating material; and
  generating, based on the information about the coating material, the image data representing the image containing a texture of sparkle for expressing a reflection characteristic of the object according to reflections of light on the plurality of flakes.

20. A non-transitory computer-readable storage medium storing instructions that, when executed by a computer, cause the computer to perform a method for an image processing apparatus configured to generate image data representing an image for simulating appearance of an object coated with a coating material containing a plurality of flakes, the method comprising:
  acquiring information about the coating material; and
  generating, basaed on the information about the coating material, the image data representing the image containing a texture of sparkle for expressing a reflection characteristic of the object according to reflections of light on the plurality of flakes.

* * * * *